(12) United States Patent
Stark et al.

(10) Patent No.: US 7,036,291 B1
(45) Date of Patent: May 2, 2006

(54) PRESSURIZED SANITARY PRECISION POLYMER FILM CASTING AND DISPERSION INJECTION SYSTEM AND METHOD OF CONSTRUCTING A PRESSURIZED SANITARY PRECISION POLYMER FILM CASTING AND DISPERSION INJECTION SYSTEM

(76) Inventors: Patricia A. Stark, 12567 SW. Pembroke Cir. N., Lake Suzy, FL (US) 34269; Jon Zook, 8101 County Rd. #104, Ft. Myers, FL (US) 33919

( * ) Notice: Subject to any disclaimer, the term of this patent is extended or adjusted under 35 U.S.C. 154(b) by 0 days.

(21) Appl. No.: 10/724,672

(22) Filed: Dec. 1, 2003

Related U.S. Application Data

(63) Continuation-in-part of application No. 10/378,183, filed on Mar. 3, 2003, now Pat. No. 6,823,653.

(51) Int. Cl.
*B65B 47/02* (2006.01)

(52) U.S. Cl. .......................... 53/454; 53/140; 53/560; 222/146.5

(58) Field of Classification Search ............... 222/593, 222/146.2, 146.5; 53/560, 140, 141, 452, 53/454
See application file for complete search history.

(56) References Cited

U.S. PATENT DOCUMENTS

| | | | | |
|---|---|---|---|---|
| 2,309,545 A | * | 1/1943 | Scherer | 53/140 |
| 3,282,469 A | * | 11/1966 | Skonberg | 222/146.5 |
| 3,982,669 A | * | 9/1976 | Moore | 222/146.5 |
| 4,195,755 A | * | 4/1980 | Slautterback et al. | 222/146.5 |
| 4,632,277 A | * | 12/1986 | Pallante | 222/146.2 |
| 4,632,281 A | * | 12/1986 | Wold | 222/146.2 |
| 4,817,367 A | * | 4/1989 | Ishikawa et al. | 53/560 |
| 5,148,947 A | * | 9/1992 | Epp et al. | 222/146.5 |
| 5,683,578 A | * | 11/1997 | Zook et al. | 222/146.2 |
| 6,340,473 B1 | * | 1/2002 | Tanner et al. | 424/451 |
| 6,391,237 B1 | * | 5/2002 | Kearney et al. | 264/132 |
| 6,499,631 B1 | * | 12/2002 | Zook | 222/146.6 |
| 6,745,546 B1 | * | 6/2004 | Tanner et al. | 53/560 |

* cited by examiner

*Primary Examiner*—Louis Huynh
(74) *Attorney, Agent, or Firm*—Edward P. Dutkiewicz

(57) ABSTRACT

An output supply assembly has a horizontal base receiving a container of a flowable material. A platen is positionable in the container. A pump feeds the pressurized flowable material from the container. A dispensing and handling assembly has two film-forming dies of similar configuration. A pair of hoses is provided between the output supply assembly and the dispensing and handling assembly. A control assembly couples the output supply assembly and the dispensing and handling assembly. Flowable material is fed through the assembly to form film. A pair of film-movers are beneath the film-forming dies. A pair of rotary dies are beneath the film-movers. An injector is located above the film-movers for periodic dispensing of particulate material. Containers are formed upon the solidification of the flowable material moving between the dies.

5 Claims, 15 Drawing Sheets

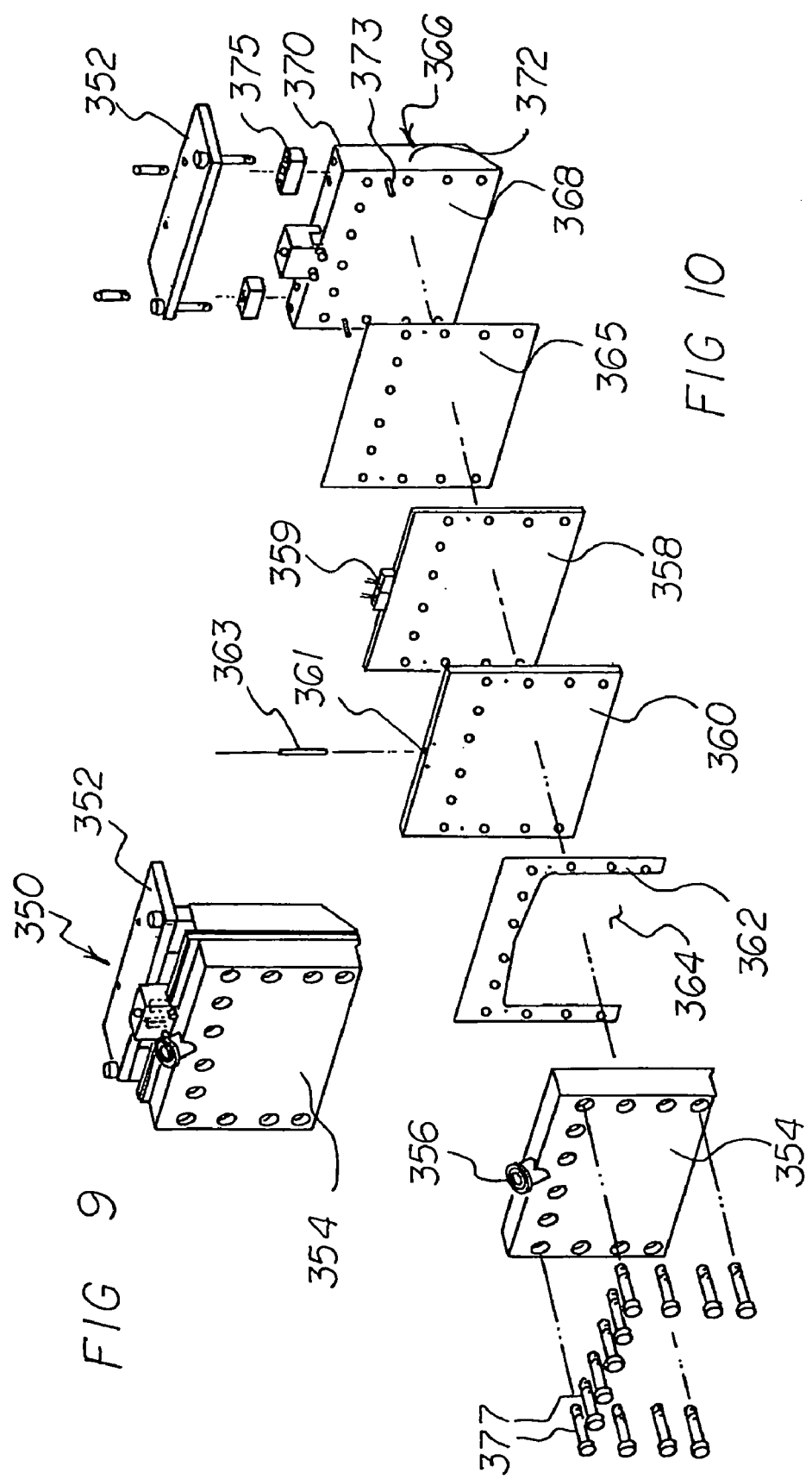

| BILL OF MATERIALS ||
|---|---|
| ITEM | DESCRIPTION |
| A | ONE PIECE SPECIAL STAINLESS STEEL FITTING |
| B | BRASS COMPRESSION SLEEVE |
| C | HOSE COLLAR PART A |
| D | HOSE COLLAR PART B |
| E | HOSE COLLAR PART C |
| F | PROTECTIVE CORD COVER |
| G | CLEAR PVC VACUUM TUBING |
| H | BLACK POLYESTER TAPE |
| I | THERMAL INSULATION |
| J | KAPTON TAPE |
| K | HEATER WIRE |
| L | STAINLESS STEEL BRAIDED TEFLON HOSE |
| M | SEALANT |

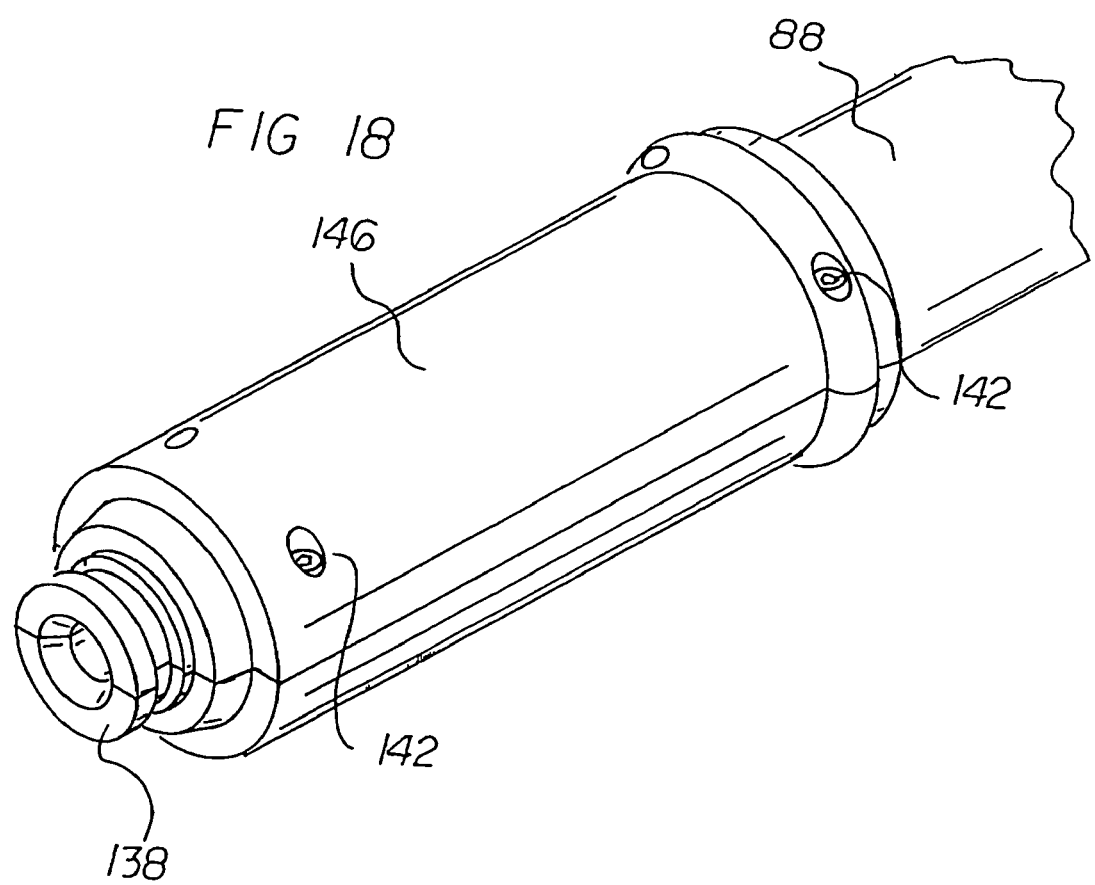

PRESSURIZED SANITARY PRECISION POLYMER FILM CASTING AND DISPERSION INJECTION SYSTEM AND METHOD OF CONSTRUCTING A PRESSURIZED SANITARY PRECISION POLYMER FILM CASTING AND DISPERSION INJECTION SYSTEM

This application is a Continuation-in-Part of application Ser. No. 10/378,183, filed Mar. 3, 2003, now U.S. Pat. No. 6,823,653.

BACKGROUND OF THE INVENTION

1. Field of the Invention

The present invention relates to a pressurized sanitary precision polymer film casting and dispersion injection system and method of constructing the same, and more particularly pertains to creating individual containers, packets and capsules of particulate material such as medicine, soap and the like in a safe and economical manner.

2. Description of the Prior Art

The use of packaging systems of known designs and configurations is known in the prior art. More specifically, packaging systems of known designs and configurations previously devised and utilized for the purpose of creating containers for particulate material through conventional methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,683,578 to Zook relates to a filter valve system for regulating, filtering, and dispensing a flow of hot melt materials and adhesive. U.S. Pat. No. 6,340,473 to Tanner relates to film forming compositions comprising modified starches and iota-carrageenan and methods for manufacturing soft capsules using same. U.S. Pat. No. 6,391,237 to Kearney relates to the formation of indicia in the base of a blister pack for transference to a body cast therein. U.S. Pat. No. 6,499,631 to Zook relates to a hot melt adhesive applicator.

While these devices fulfill their respective, particular objectives and requirements, the aforementioned patents do not describe a pressurized sanitary precision polymer film casting and dispersion injection system that allows creating individual containers, packets and capsules of particulate material such as medicine, soap and the like in a safe and economical manner.

In this respect, the sanitary precision polymer film casting and dispersion injection system according to the present invention substantially departs from the conventional concepts and designs of the prior art, and in doing so provides an apparatus primarily developed for the purpose of creating individual containers, packets and capsules of particulate material such as medicine, soap and the like in a safe and economical manner.

Therefore, it can be appreciated that there exists a continuing need for a new and improved pressurized sanitary precision polymer film casting and dispersion injection system which can be used for creating individual containers, packets and capsules of particulate material such as medicine, soap and the like in a safe and economical manner. In this regard, the present invention substantially fulfills this need.

SUMMARY OF THE INVENTION

In view of the foregoing disadvantages inherent in the known types of packaging systems of known designs and configurations now present in the prior art, the present invention provides an improved sanitary precision polymer film casting and dispersion injection system. As such, the general purpose of the present invention, which will be described subsequently in greater detail, is to provide a new and improved sanitary precision polymer film casting and dispersion injection system and method which has all the advantages of the prior art and none of the disadvantages.

To attain this, the present invention essentially comprises a pressurized sanitary precision polymer film casting and dispersion injection system for creating individual containers of particulate matter in a safe and economical manner. The system comprises several components, in combination. First provided is a container of a polymer. The container has a first volume. The polymer is a solid at a first, ambient temperature and flowable at a second, heated temperature. The container has a first height and a first diameter. Next provided is an output master supply assembly having a first control panel. The assembly has a horizontal base for the receipt of a container of polymer film material. The assembly has a plurality of vertical hydraulic cylinders. The assembly has a pair of cross members coupling with the vertical hydraulic cylinders for maintaining the vertical cylinders in alignment. The supply assembly has a drive subassembly. The drive subassembly has an upper platform that is fixedly coupled to the cross members and located a second distance from the horizontal base. The second distance is greater than the first height. A hydraulic source is coupled to upper platform. The drive subassembly has a plurality of thrust shafts, with the thrust shafts coupled to the cross members. The hydraulic source provides an upward and a downward movement of the vertical hydraulic cylinders and the thrust shafts. The drive subassembly also has a platen. The platen is disposed beneath the upper platform. The platen is coupled to the thrust shafts and is moveable in an upward and a downward direction relative to the platform. The platen has a generally round disk shape having a second diameter. The second diameter is less than the first diameter. The platen comprises an upper portion having a flat upper surface and a recessed lower surface having a heating component there within. The lower portion has a flat upper surface and a concave lower surface. The platen has a thickness forming an edge, and the platen has an O-ring coupled there to. The platen has a centrally located hole there through, from the upper surface of the upper portion to the lower surface of the lower portion to provide a passageway there through. The platen has an electrical coupling to provide energy to the heating element there within. The platen has an outflow coupling located on the upper surface with the coupling communicating with the passageway through the platen. The motor of the subassembly moves the platen downward against the polymer in the container. Next provided is a dual gear, single outlet material pump. The pump comprises a rectilinear base plate having an upper surface and a lower surface with a side edge having a thickness there between. The base plate has an inflow opening there through. The upper surface of the base plate has a plurality of pin recesses, threaded screw recesses and bearing recesses there in. The pump has a lower gear plate having a rectilinear configuration with an upper surface and a lower surface with a side edge having a thickness there between. The lower gear plate has a tri-lobed aperture there through with each of the lobes having a third diameter. The lower gear plate has an outlet on the edge, the outlet communicating with the tri-lobed aperture. The pump has an idler shaft and a drive shaft. Each shaft has a fifth external diameter. The idler shaft has an associated upper and lower bearing. The drive shaft has an associated upper and lower bearing. The pump has a pair of lower gears with each having a shaft hole there through. The pump has a drive gear and an idler gear. Each gear has a fourth diameter. The fourth diameter is slightly less than the third diameter with the fifth diameter being less than the fourth. Each of the gears is housed within the tri-lobed aperture of the lower gear plate. A seal is located between the base plate and the lower gear plate. The pump has a pair of alignment pins. The pump has a spacer plate. The spacer plate has a plurality of pin holes, shaft holes, a material flow hole, and bolt holes there through. The spacer plate has a plurality of temperature sensor recesses there into. There is a seal located between the lower gear plate and the spacer plate. The idler shaft passes through a shaft hole in the spacer plate and through the shaft hole of the lower gear plate. The drive shaft passes through a shaft hole in the spacer plate and the shaft hole of the lower drive gear. The pump has an upper gear plate having a rectilinear configuration with an upper surface and a lower surface with a side edge having a thickness there between. The upper gear plate has a tri-lobed aperture there through with each of the lobes having a third diameter. The upper gear plate has an outlet on the edge. The outlet communicates with the tri-lobed aperture. The pump has a pair of upper gears, with each gear having an external fourth diameter and a shaft hole there through. The shaft hole has a fifth diameter. The gears are a drive gear, which is coupled to the drive shaft, and an idler gear, which is coupled to the idler shaft. The gears are housed within the tri-lobed aperture of the upper gear plate. The pump has a top plate. The top plate has an upper surface and a lower surface with a side edge having a thickness there between. The lower surface of the top plate has a plurality of pin recesses and bearing recesses there in. The top plate also has a plurality of screw holes there through. There is a seal positioned between the top plate and the upper gear plate. The pump has a plurality of heating plates that are coupled to the sides of the assembled pump to provide heat to the pump and the material as it passes through the pump. The pump has a plurality of temperature sensors coupled to the temperature sensor recesses. The pump drive shaft is sized to pass through the drive gears and plates and to be received by an upper and lower bearing. The pump also has a plurality of bolts to couple the plates to each other. The pump is coupled to the platen outflow coupling and is positioned to receive material from the container. The pump has an outlet manifold plate for coupling with each of the outlets of the lower gear plate and the upper gear plate to form a single outlet. Next provided is a primary feed hose having an inflow end and an outflow end. The inflow end of the hose is coupled with a clamp to the outlet of the dual geared single outlet material pump. The hose has a central pathway there through to allow the passage of material through the hose. The hose has an inner layer forming a smooth inner surface of the hose pathway and an armored crush-resistant outer layer. The hose has a heating layer disposed between the inner layer and the outer layer. The heating layer is coupled to a power source by a wire. The hose has a pair of hollow tubular fittings. Each of the fittings has a smooth inner surface with the surface having a radius beveled inlet to reduce the area of diminished flow within the hose. Each of the fittings has a stepped outer surface to provide a gripping surface thereto. Next provided is a secondary container of a polymer having a second volume. The second volume is substantially less than the first volume. The polymer is solid at a first, ambient temperature and flowable at a second, heated temperature. The container has a second height and a fifth diameter. The second container is coupled with a clamp to the outflow end of the primary feed hose. Next provided is an intermediate output supply assembly having a second control panel. The assembly has a horizontal base for the receipt of a container of polymer film material. The assembly has a plurality of vertical hydraulic cylinders and a cross member coupling with the vertical hydraulic cylinders with the cross member maintaining the vertical hydraulic cylinders in alignment. The supply assembly has a drive subassembly. The drive subassembly has a motor providing a hydraulic force to the vertical hydraulic cylinders. There is a hydraulic source that is coupled to the cross member. The drive subassembly has at least one thrust shaft coupled to the cross member. The hydraulic source provides a hydraulic force to the hydraulic cylinders and thereby provides an upward and downward movement of the thrust shaft. The drive subassembly also has a platen. The platen is coupled to the thrust shaft and is moveable in a upward and downward direction. The platen has a generally round disk shape having a sixth diameter. The sixth diameter is less than the fifth diameter. The platen comprises an upper portion having a flat upper surface and a recessed lower surface. The platen has a heating component there within. The platen has a lower portion with a flat upper surface and a concave lower surface. The platen has a thickness forming an edge and has at least one O-ring coupled there to. The platen has a centrally located hole there through from the upper surface of the upper portion to the lower surface of the lower portion to provide a passageway there through. The platen has an electrical coupling to provide energy to the heating element there within, and an outflow coupling located on the upper surface and communicating with the passageway through the platen. The motor of the subassembly moves the platen downward against the polymer in the container. Next provided is a dual gear, dual outlet material pump. The pump comprises a rectilinear base plate having an upper surface and a lower surface with a side edge having a thickness there between. The base plate has an inflow opening there through. The upper surface of the base plate has a plurality of pin recesses, threaded screw recesses, and bearing recesses there in. The pump has a lower gear plate. The lower gear plate has a rectilinear configuration with an upper surface and a lower surface with a side edge having a thickness there between. The lower gear plate has a tri-lobed aperture there through with each of the lobes having a third diameter. The lower gear plate has an outlet on the edge with an outlet stub coupled there to. The outlet communicates with the tri-lobed aperture. The pump has a pair of lower gears, a drive gear and an idler gear. Each gear has a fourth diameter. The fourth diameter being slightly less than the third diameter. The gears each have an associated gear bearing and each gear is housed within the tri-lobed aperture of the lower gear plate. Each of the gears has a shaft hole there through. The pump has a seal located between the base plate and the lower gear plate. The pump has a pair of alignment pins. The pump has a spacer plate, with the plate having a plurality of pin holes, shaft holes, a material flow hole, and bolt holes there through. The spacer plate has a plurality of temperature sensor recesses there into. The pump has a seal located between the lower gear plate and the spacer plate. The idler shaft passes through a shaft hole in the spacer plate and the shaft hole of the lower idler gear. The pump has an upper gear plate that has a rectilinear configuration with an upper surface and a lower surface with a side edge having a thickness there between. The upper gear plate has a tri-lobed aperture located there through with each of the lobes having a third diameter. The upper gear plate has an outlet on the edge with an outlet stub coupled there to. The outlet communicates with the tri-lobed aperture. The upper gear plate has an associated pair of upper gears, being a drive gear and an idler gear. Each gear has a fourth diameter. The fourth diameter being slightly less than the third diameter. The gears each has an associated gear bearing. Each gear is housed within the tri-lobed aperture of the upper gear plate. Each of the gears has a shaft hole there through. The pump has a top plate having an upper surface and a lower surface with a side edge having a thickness there between. The lower surface of the top plate has a plurality of pin recesses and bearing recesses there in. The top plate also has a plurality of screw holes there through and a drive shaft hole there through. There is a drive shaft that has an associated seal retainer. The drive shaft is sized to pass through the drive gears and plates, to be received by a bearing. There is a seal being positioned between the top plate and the upper gear plate. The pump has a plurality of heating plates that are coupled to the sides of the assembled pump to provide heat to the pump and the material as it passes through the pump. There is a plurality of temperature sensors coupled to the temperature sensor recesses. The pump also has a plurality of bolts to couple the plates to each other. The pump is coupled to the platen hole and is positioned to receive material from the container. Next provided is a pair of secondary feed hoses. Each hose has an inflow end and an outflow end. The inflow end of each hose is coupled with a clamp to the one of the outlets of the dual geared dual outlet material pump. Each of the hoses has a central pathway there through to allow the passage of material through the hose. Each of the hoses has an inner layer forming a smooth inner surface of the hose pathway and an armored crush-resistant outer layer. There is a heating layer disposed between the inner layer and the outer layer. The heating layer is coupled to a power source by a wire. Each of the hoses has a pair of hollow tubular fittings. The fittings each have a smooth inner surface having a radius beveled inlet to reduce the area of diminished flow within the hose. The fittings each have a stepped outer surface to provide a gripping surface thereto. Next provided is a pair of filters. Each filter has an inlet and an outlet. Each filter has a plurality of filter elements associated there with. The inlet and outlet each have an associated cone shaped connector that is coupled to the filter body. The filter body is centrally located and has associated O-rings. The inlet of each of the filters is coupled with a clamp to the outflow end of each of the secondary feed hoses. Next provided is a pair of injection valves. Each valve has a material inflow end with a material inflow aperture. Each valve is coupled to the outlet of a filter. The inflow end of the valve has an outflow aperture having a seventh diameter. Each valve has a pressurized end with a pressure inflow aperture and a pressure cavity. The pressure cavity has a piston subassembly. The inflow end of the injection valve has a valve subassembly there within. The valve subassembly comprises a valve pin with a head having an eighth diameter, with the eighth diameter being slightly smaller than the seventh diameter. The pin is sized to block the outflow aperture. The valve pin has an associated spring and pin contact shaft. The inflow end of the injection valve is separated from the pressurized end of the injection valve by a diaphragm. The piston subassembly has a piston, an associated piston shaft, and a plurality of associated O-rings. The piston shaft contacts the valve pin contact shaft, and when pressure is introduced into the pressurized end the piston is moved toward the inflow end of the injection valve. The movement thereby effectuates the movement of the valve pin to an open position allowing material within the inflow end of the injection valve to move outward through the outflow aperture. When the pressure in the pressurized end of the injection valve drops, the valve pin spring moves the valve pin to the closed position. Next provided is a pressure source that is coupled to the pressurized end of the injection valve. Next provided is a plurality of dies of a similar configuration. Each of the dies has a mounting plate and a distribution plate parallel with the mounting plate. The distribution plate has an upper edge with a material feed aperture for the receipt of liquid polymer. Each die has a heater plate. There is an insulator dielectric plate between the heater and the mounting plate. There is a shim in an inverted U-shaped configuration adjacent to the distribution plate and an extrusion face between the shim and the heater. All die plates have a generally rectilinear configuration with an upper edge, a lower edge and side edges there between whereby polymer may be fed through the distribution plate there through the opening in the shim. Each material feed aperture of each die is coupled to an outflow aperture of an injection valve. Next provided is a polymer dispensing assembly having a control box and a motor. The assembly has a plurality of dies coupled there to. The dispensing assembly has a pair of roller conveyors that are rotatable about parallel axes. The exterior surfaces of each of the roller conveyers is positioned immediately beneath the shim of each of the dies. The dispensing assembly has a pair of rotary cohesion dies. The cohesion dies each have axes parallel with each other. The axes of the cohesion dies are located between the roller conveyors. The rotary cohesion dies are in a closely spaced relationship with each other and have circumferential pressure surfaces. The polymer dispensing assembly has a positive displacement pumping device providing dial-in incremental, thermal and precise dosage control. he positive displacement pumping device is located above the rotary cohesion dies and provides for the periodic dispensing of particulate materials between packets formed with the solidification of the polymer moving between the rotary cohesion dies. Lastly provided is a master control panel coupling the output master supply assembly, the dual gear, single outlet material pump, the primary and secondary hoses, the intermediate output supply assembly, the dual gear, dual outlet material pump and the polymer dispensing assembly for continuous and automatic control of the speed of the pump and the rate of rotation of the rollers. The master control panel also controls the heat of the tube, the platen, and the dies.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pressurized sanitary precision polymer film casting and dispersion injection system which has all of the advantages of the prior art packaging systems of known designs and configurations and none of the disadvantages.

It is another object of the present invention to provide a new and improved pressurized sanitary precision polymer film casting and dispersion injection system which may be easily and efficiently manufactured and marketed.

It is further an object of the present invention to provide a new and improved pressurized sanitary precision polymer film casting and dispersion injection system which is of durable and reliable constructions.

An even further object of the present invention is to provide a new and improved pressurized sanitary precision polymer film casting and dispersion injection system which is susceptible of a low cost of manufacture with regard to both materials and labor, and which accordingly is then susceptible of low prices of sale, thereby making such sanitary precision polymer film casting and dispersion injection system economically available.

Even still another object of the present invention is to provide a pressurized sanitary precision polymer film casting and dispersion injection system for creating individual containers, packets and capsules of particulate material such as medicine, soap and the like in a safe and economical manner.

Lastly, it is an object of the present invention to provide a new and improved pressurized sanitary precision polymer film casting and dispersion injection system. An output supply assembly includes a horizontal base. The base receives a container of a flowable material. A platen is positionable in the container. A pump feeds the flowable material from the container. A precision dispensing and handling assembly is provided. The dispensing and handling assembly includes two film-forming dies of similar configuration. Flowable material may be fed through the assembly to form film. A pair of film-movers are beneath the film-forming dies. A pair of cohesion dies are provided beneath the film-movers. An injector is located above the film-movers. In this manner the periodic dispensing of particulate material is allowed. Containers are formed upon the solidification of the flowable material moving between the cohesion dies. A pair of thermal sanitary hoses is provided between the output supply and the dispensing and handling assembly. A control system couples the output supply and the dispensing and handling assemblies.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 9 is an enlarged perspective view of one slot die shown in FIGS. 1 and 2.

FIG. 10 is an exploded perspective view of the component of FIG. 9.

FIG. 18 is a side perspective of a hose ending showing the placement of the fitting and the hose clamp.

The same reference numerals refer to the same parts throughout the various Figures.

DESCRIPTION OF THE PREFERRED EMBODIMENT

Figure 1:
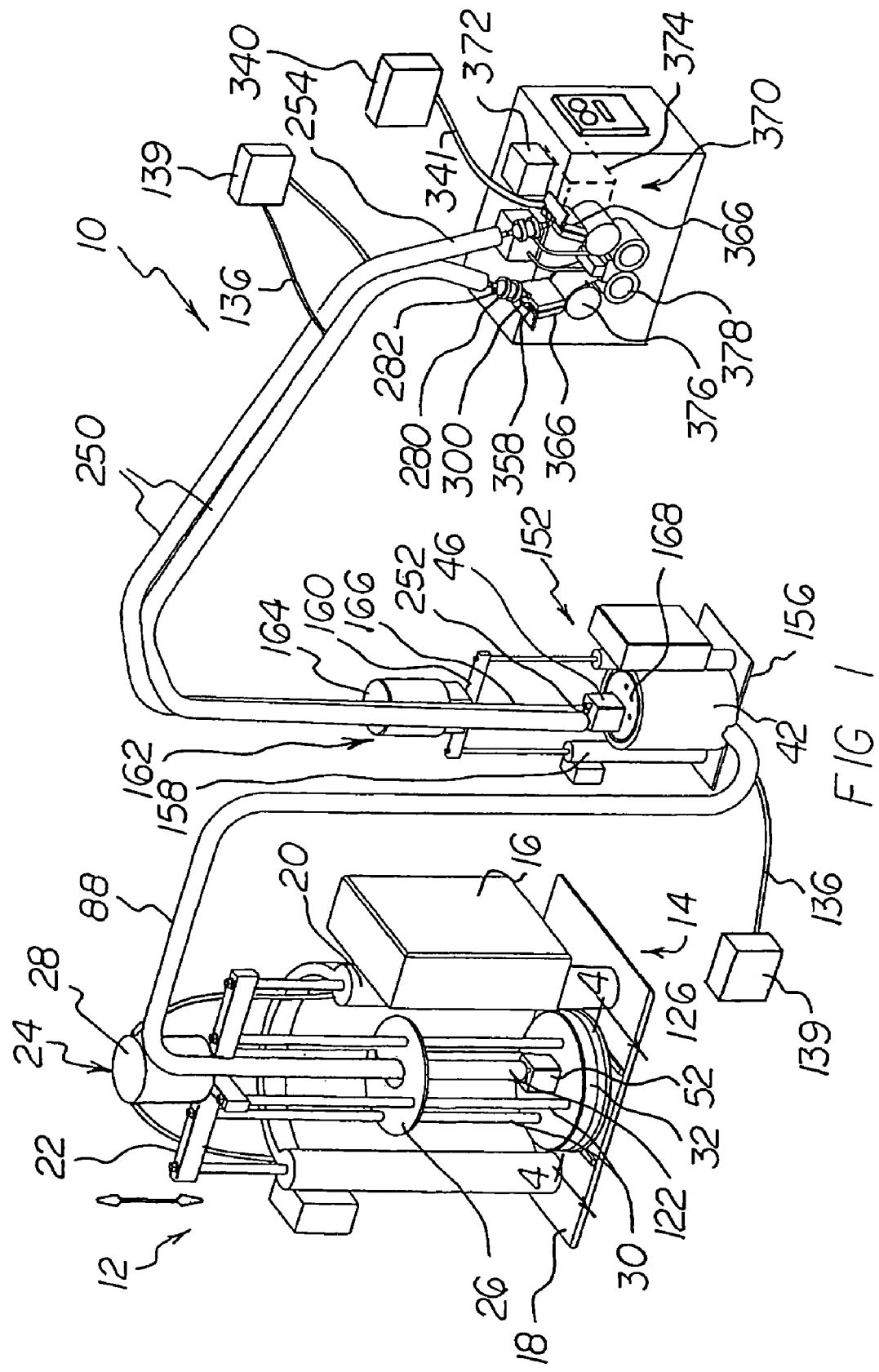
FIG. 1 is perspective illustration of a sanitary precision polymer film casting and dispersion injection system constructed in accordance with the principles of the present invention.
Figure 2:
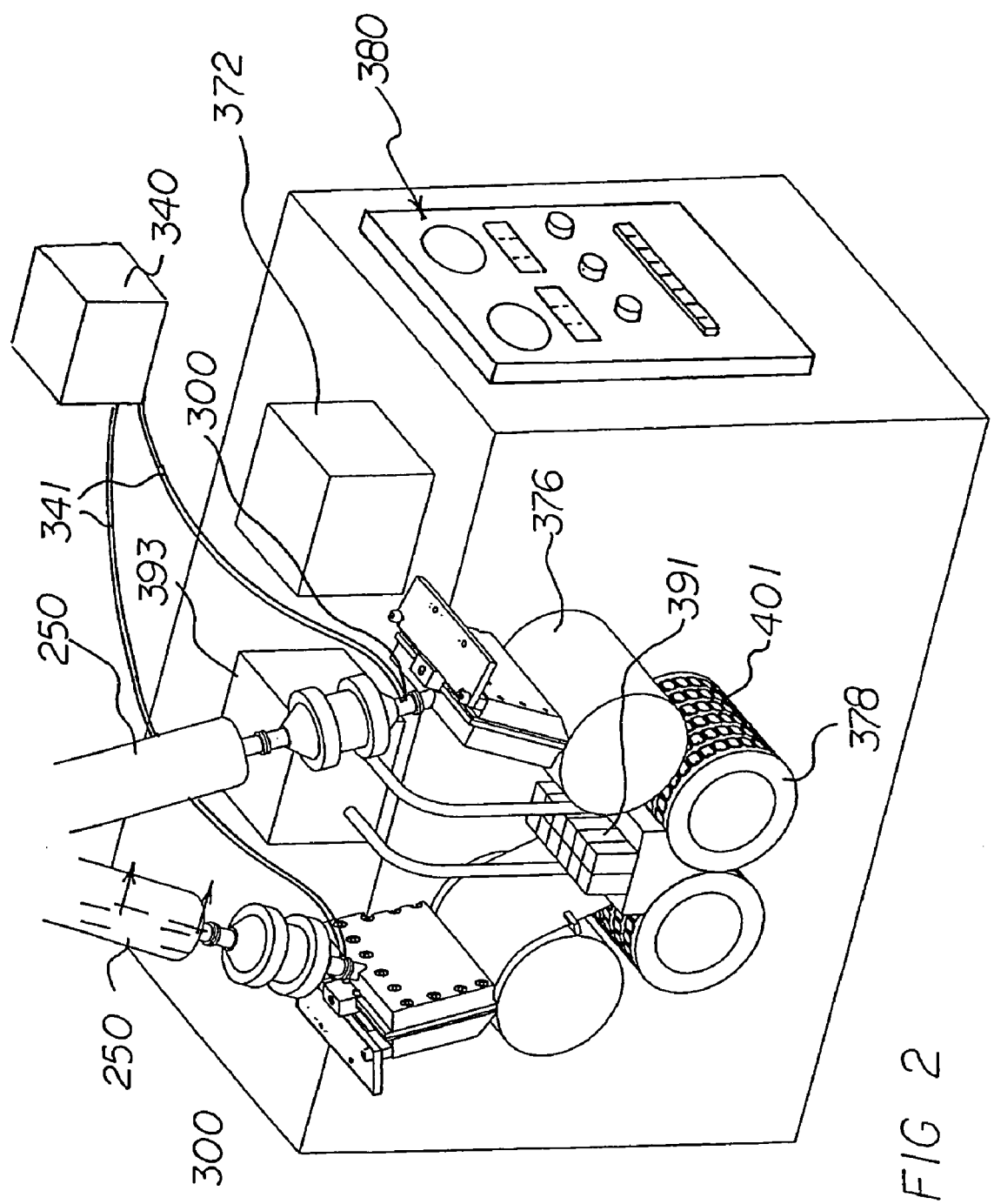
FIG. 2 is an enlarged perspective view of the polymer dispensing and handling assemblies shown in FIG. 1.
Figure 3:
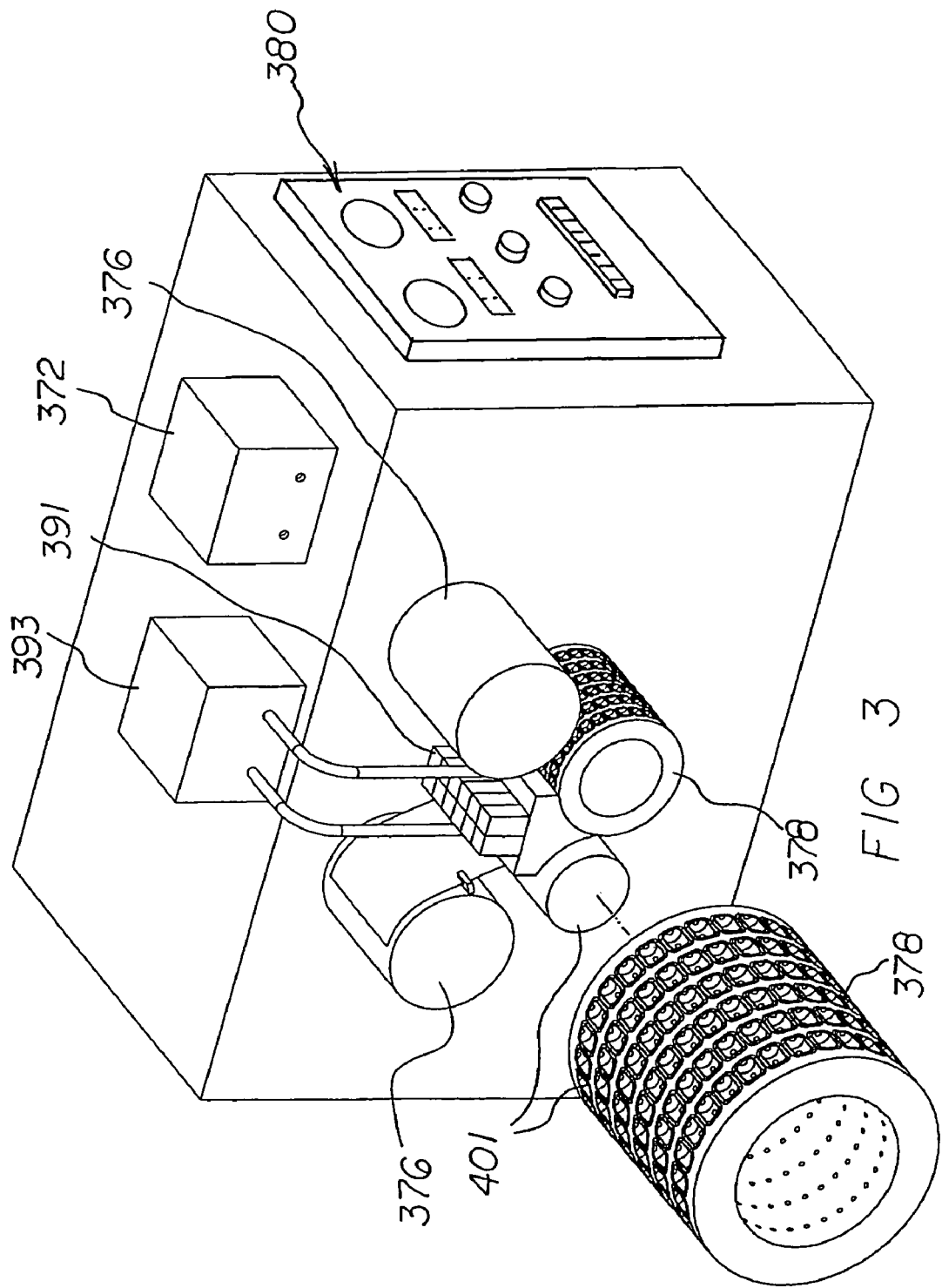
FIG. 3 is an enlarged perspective view of the assembly shown in FIG. 2 but with the dies removed and one roller displaced and enlarged.
Figure 4:
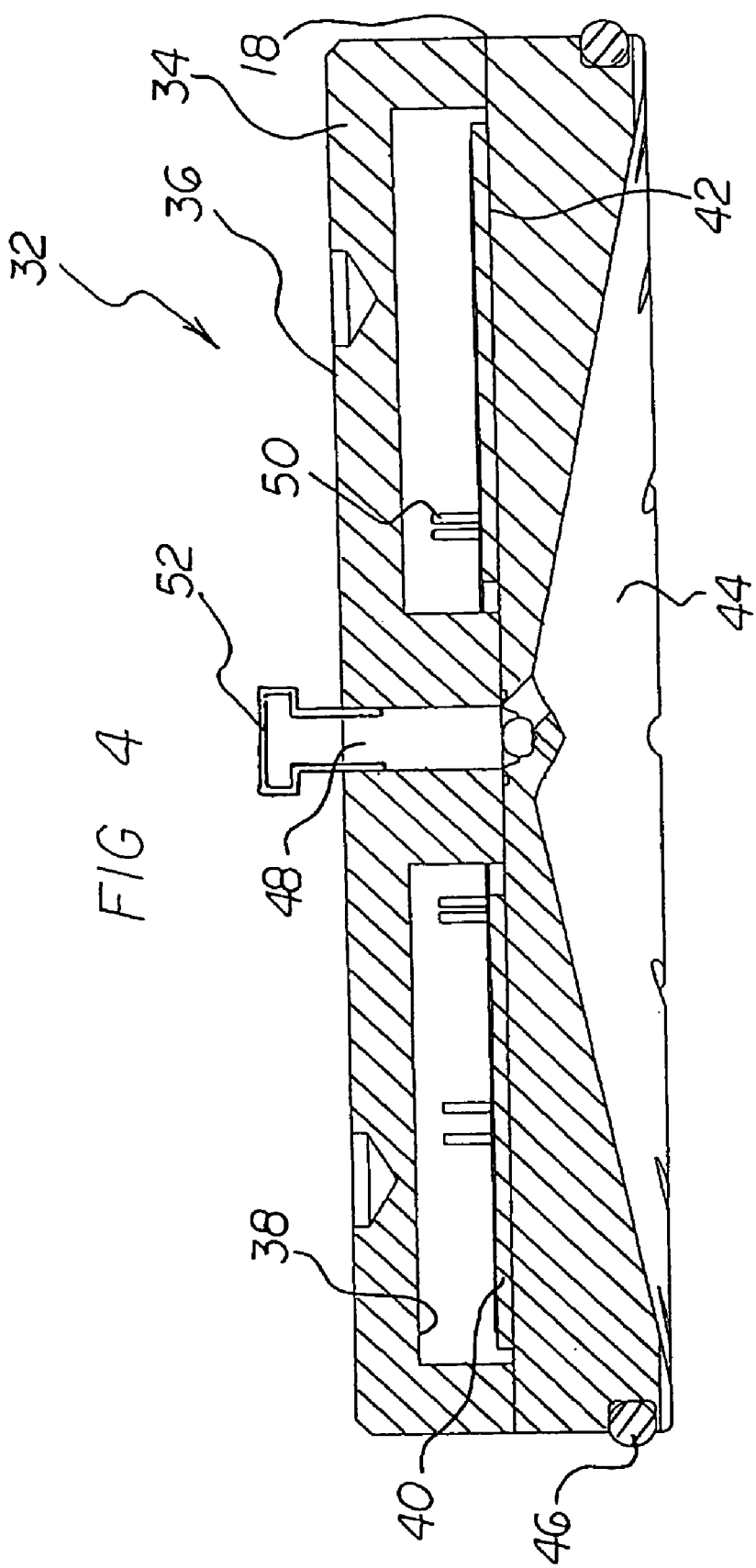
FIG. 4 is a cross-sectional view of the platen taken at line 4—4 of FIG. 1.
Figure 5:
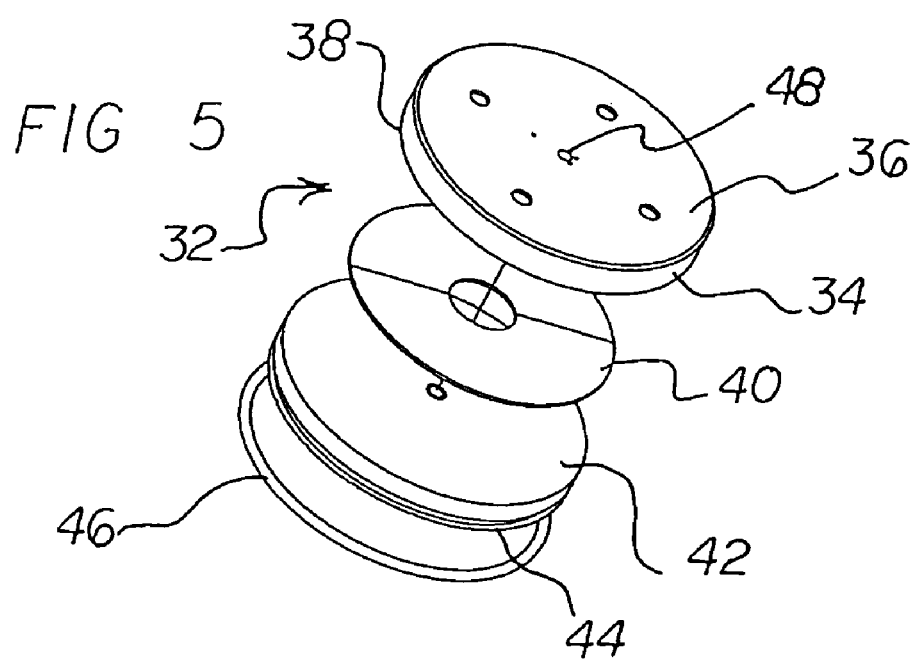
FIG. 5 is an exploded perspective view of the component of FIG. 4.
Figure 5A:
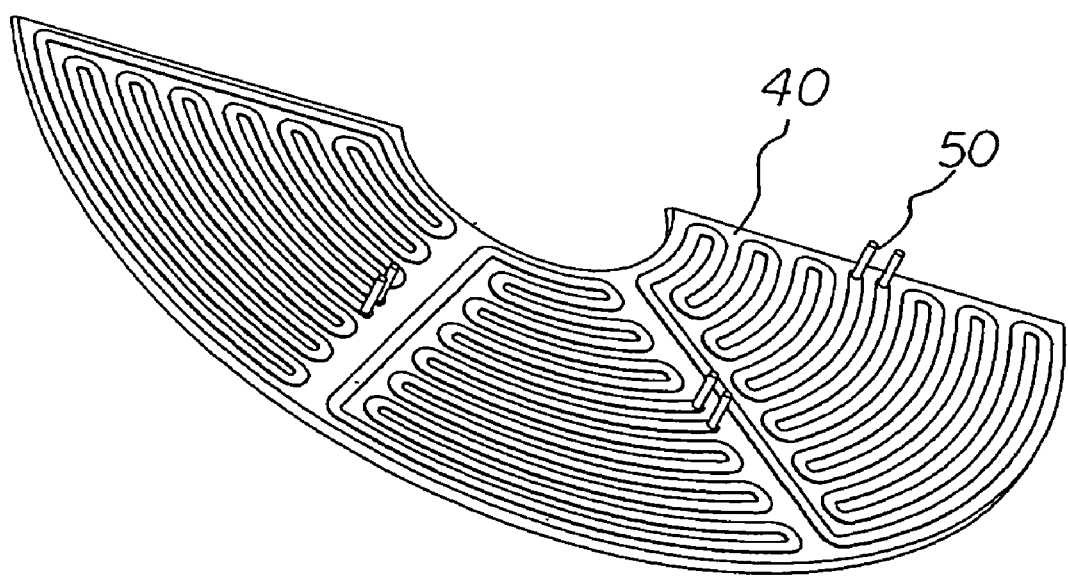
FIG. 5A is an enlarged perspective view of one half of the heating element of FIG. 5.
Figure 6:
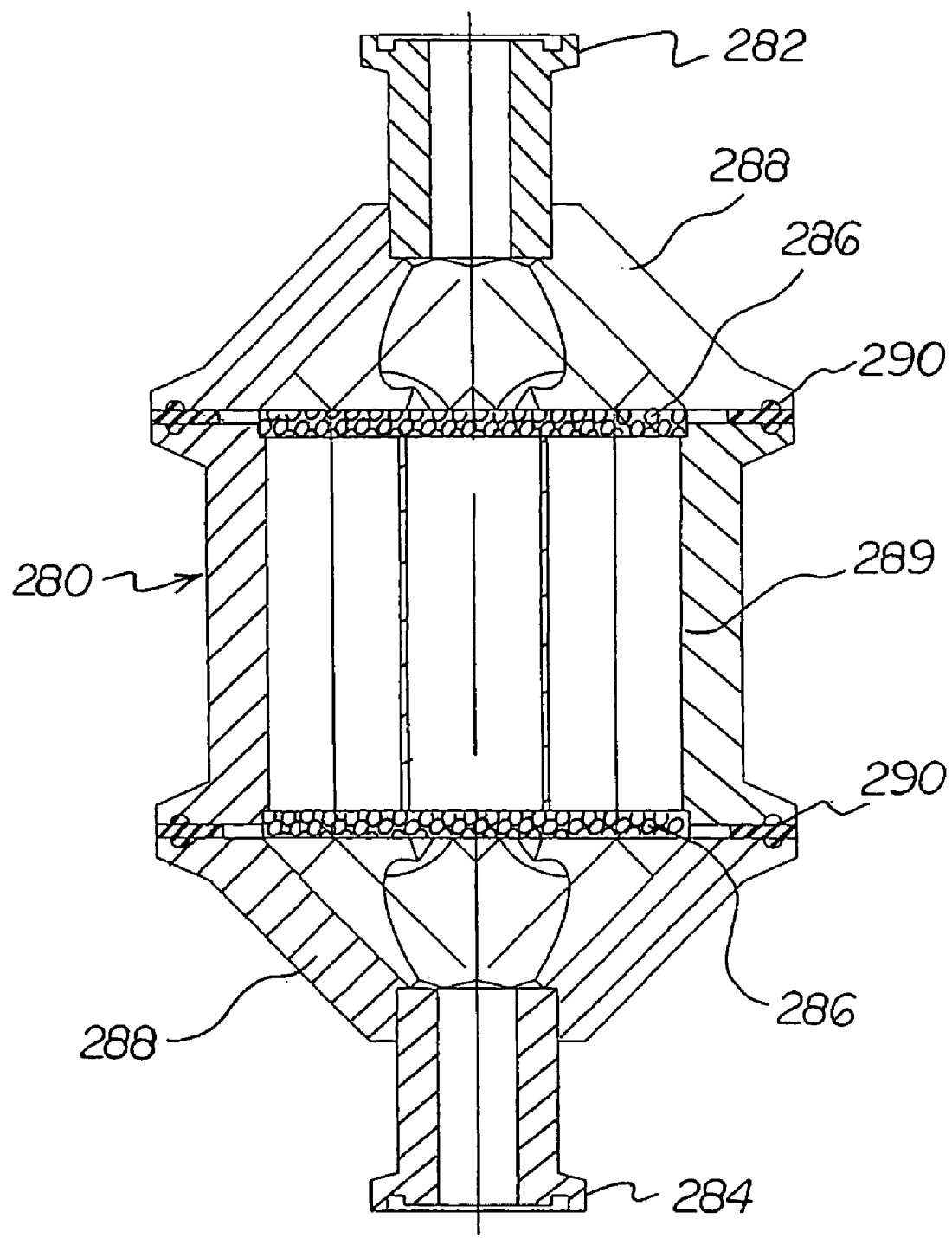
FIG. 6 is a cross-sectional view of the filter taken at line 6—6 of FIG. 2.
Figure 7:
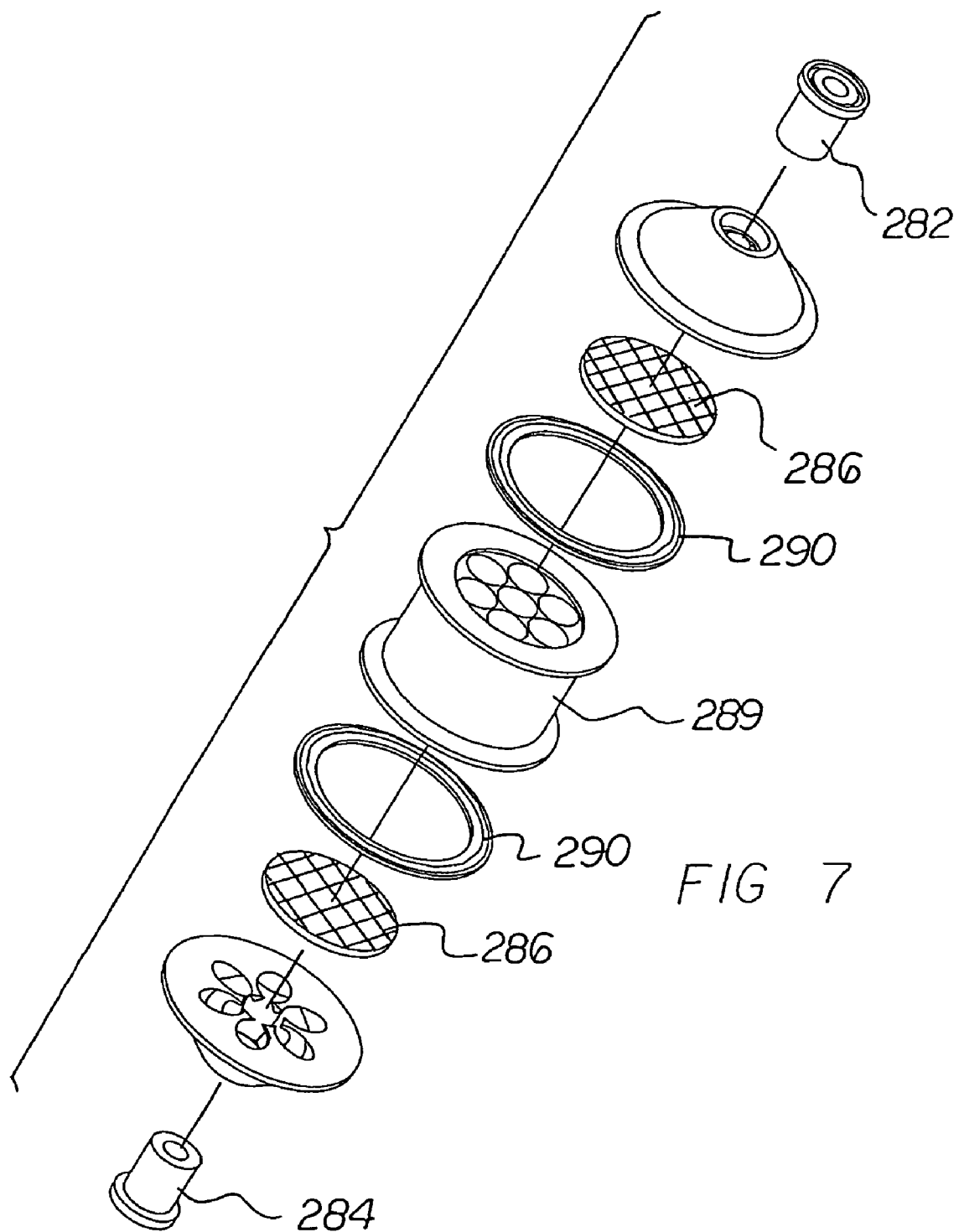
FIG. 7 is an exploded perspective view of the component of FIG. 6.
Figure 8:
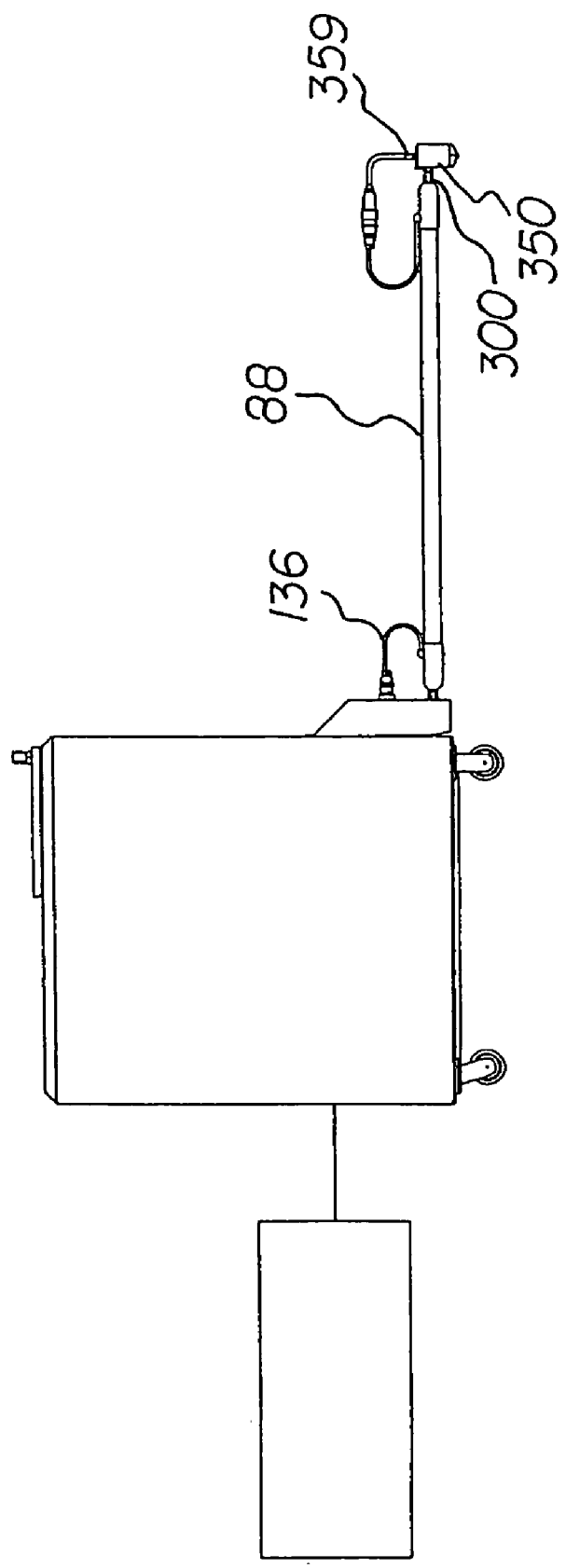
FIG. 8 is a side elevational view of the system shown in FIG. 1 but with the dispensing and handling assemblies removed.
Figures 11, 11A:
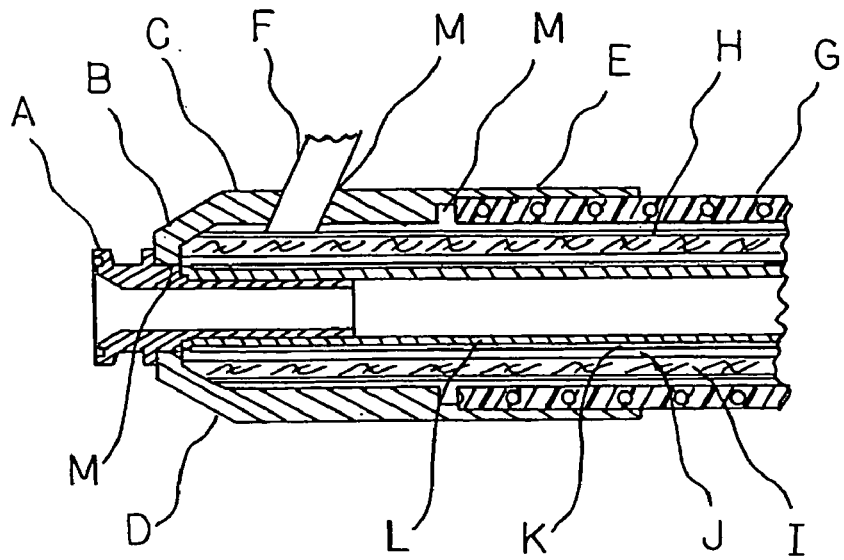
FIG. 11 is a cross-sectional view of a hose taken at line 11—11 of FIG. 2.
FIG. 11A is a bill of materials for the construction of a heater hose of the present invention.
Figure 12:
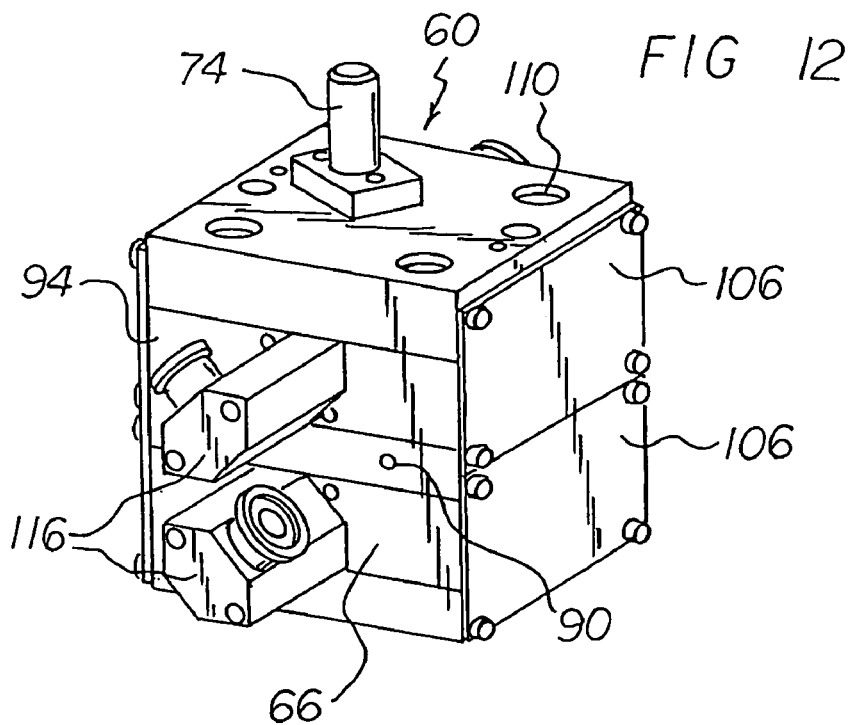
FIG. 12 is a side perspective of the dual gear driven, dual outlet material pump.
Figure 13:
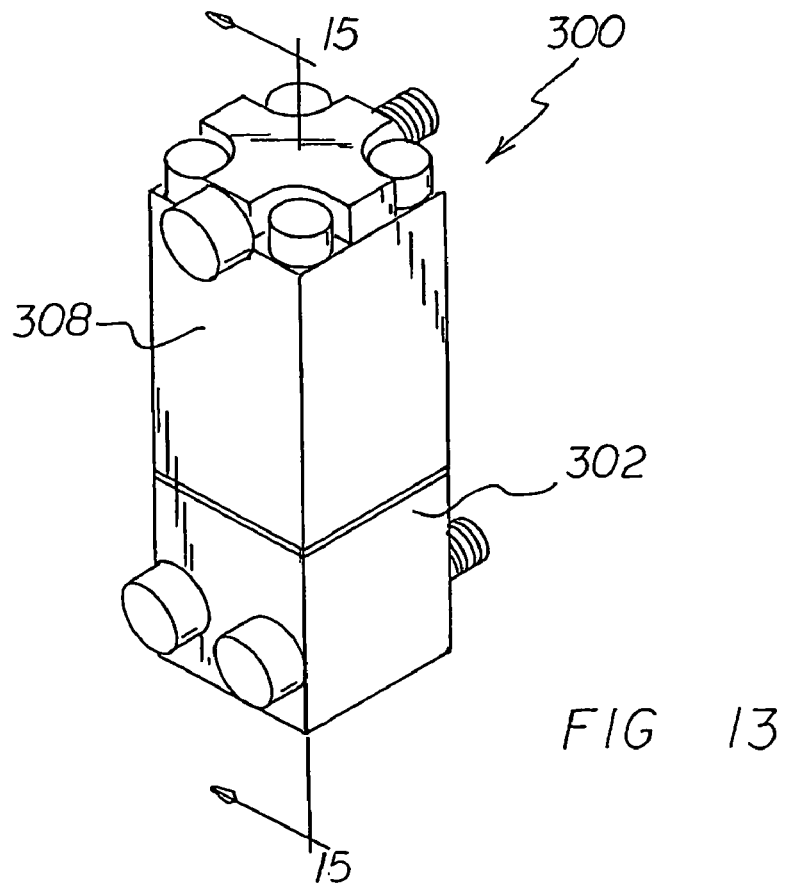
FIG. 13 is a side perspective of the injection valve of the present invention.
Figure 14:
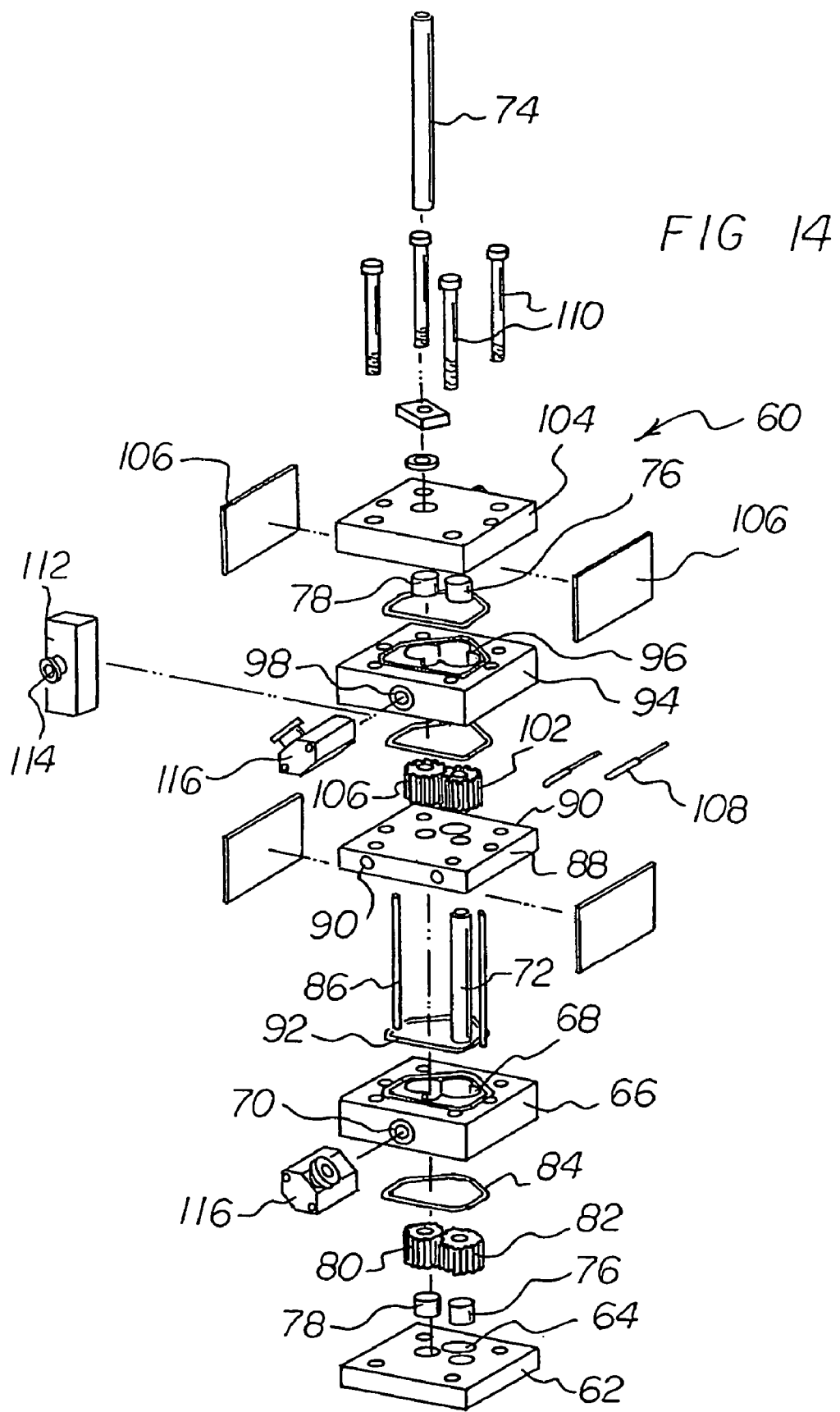
FIG. 14 is an exploded view of the dual gear driven, dual outlet material pump.
Figure 15:
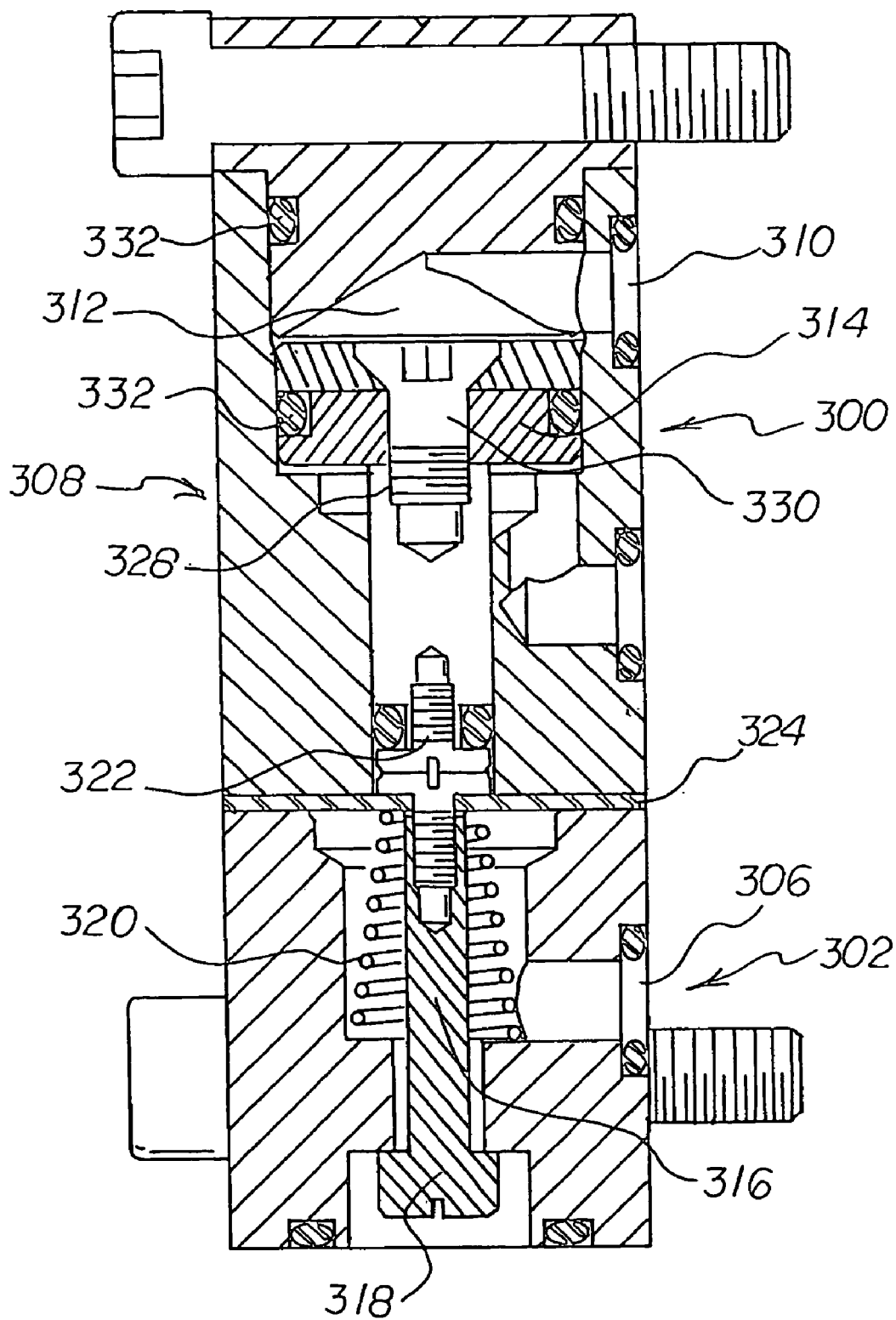
FIG. 15 is a cross section view of the injection valve of the present invention taken long line 15—15 of FIG. 13.
Figure 16:
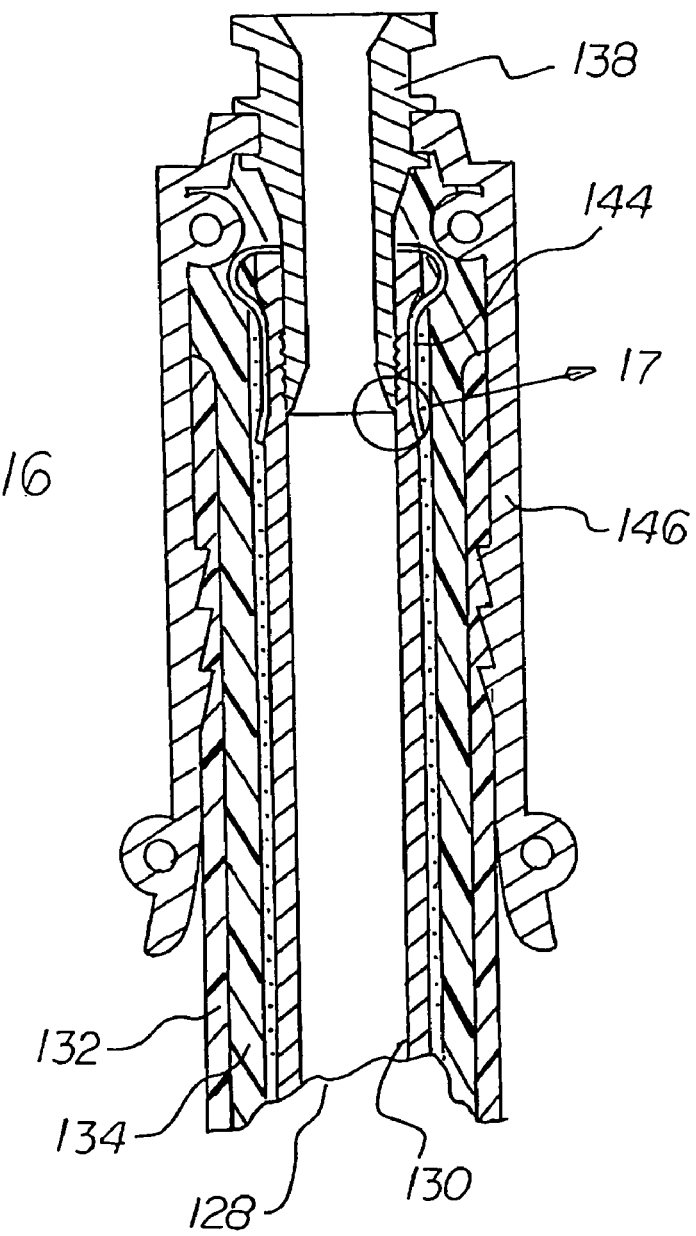
FIG. 16 is a cross section view of the hose end having a fitting coupled thereto.
Figure 17:
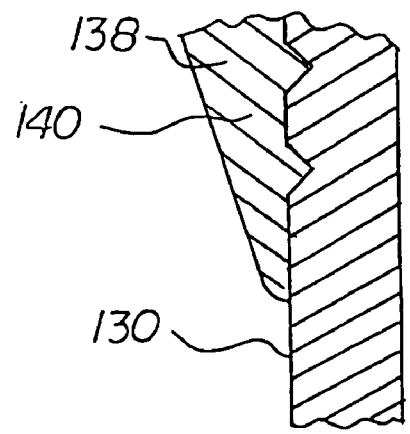
FIG. 17 is a close up cross section view taken of area 18 of FIG. 16.

With reference now to the drawings, and in particular to FIG. 1 thereof, the preferred embodiment of the new and improved sanitary precision polymer film casting and dispersion injection system embodying the principles and concepts of the present invention and generally designated by the reference numeral 10 will be described.

The present invention, the sanitary precision polymer film casting and dispersion injection system 10 is comprised of a plurality of components. Such components in their broadest context include an output supply assembly, a dispensing and handling assembly, a pair of hoses, and a control assembly. Such components are individually configured and correlated with respect to each other so as to attain the desired objective.

First provided is a container 12 of a polymer. The container has a first volume. The polymer is a solid at a first, ambient temperature and flowable at a second, heated temperature. The container has a first height and a first diameter.

Next provided is an output master supply assembly 14 having a first control panel 16. The assembly has a horizontal base 18 for the receipt of a container of polymer film material. The assembly has a plurality of vertical hydraulic cylinders 20. The assembly has a pair of cross members 22 coupling with the vertical hydraulic cylinders for maintaining the vertical cylinders in alignment.

The means for pressurizing the cylinders is described as hydraulic, but in alternate embodiments, the pressurizing means may be any commonly used means such as hydraulic or pneumatic.

The supply assembly has a drive subassembly 24. The drive subassembly has an upper platform 26 that is fixedly coupled to the cross members and located a second distance from the horizontal base. The second distance is greater than the first height. A hydraulic source 28 is coupled to upper platform. The drive subassembly has a plurality of thrust shafts 30, with the thrust shafts coupled to the cross members. The hydraulic source provides an upward and a downward movement of the vertical hydraulic cylinders and the thrust shafts.

The hydraulic source described above could be any commonly used means to pressurize a cylinder, such as hydraulic or pneumatic.

The drive subassembly also has a platen 32. The platen is disposed beneath the upper platform. The platen is coupled to the thrust shafts and is moveable in an upward and a downward direction relative to the platform. The platen has a generally round disk shape having a second diameter. The second diameter is less than the first diameter. The platen comprises an upper portion 34 having a flat upper surface 36 and a recessed lower surface 38 having a heating component 40 there within. The lower portion has a flat upper surface 42 and a concave lower surface 44. The platen has a thickness forming an edge, and the platen has an O-ring 46 coupled there to. The platen has a centrally located hole 48 there through, from the upper surface of the upper portion to the lower surface of the lower portion to provide a passageway there through. The platen has an electrical coupling 50 to provide energy to the heating element there within. The platen has an outflow coupling 52 located on the upper surface with the coupling communicating with the passageway through the platen. The motor of the subassembly moves the platen downward against the polymer in the container. The compression and heating of the polymer by the compression of the polymer by the hydraulic or pneumatic cylinders, and the contact with the heated platen may cause the polymer to achieve a viscosity of between about 1200 and 2200 centpoise at a first pressure.

In an alternate embodiment the concave surface of the lower portion may have a plurality of fins 54 for dissipation of heat.

In an alternate embodiment another driving means and pressure source such as a pneumatic means and pressure source may be employed in the vertical cylinders.

In another alternate embodiment, the platen-pressure mechanism may be replaced by gravity, with the first container being at an elevated level, and the fluid movement from the container to the pump be provided by gravity.

Next provided is a dual gear, single outlet material pump 60. The pump receives material input from the first container. The material may be delivered by a mechanically or pneumatically created pressure source, or the material may be delivered by a gravity feed.

The pump comprises a rectilinear base plate 62 having an upper surface and a lower surface with a side edge having a thickness there between. The base plate has an inflow opening 64 there through. The upper surface of the base plate has a plurality of pin recesses, threaded screw recesses and bearing recesses there in.

The pump has a lower gear plate 66 having a rectilinear configuration with an upper surface and a lower surface with a side edge having a thickness there between. The lower gear plate has a tri-lobed aperture 68 there through with each of the lobes having a third diameter. The lower gear plate has an outlet 70 on the edge, the outlet communicating with the tri-lobed aperture.

The pump has an idler shaft 72 and a drive shaft 74. Each shaft has a fifth external diameter. The idler shaft has an associated upper and lower bearing 76. The drive shaft has an associated upper and lower bearing 78.

The pump has a pair of lower gears with each having a shaft hole there through. The pump has a drive gear 80 and an idler gear 82. Each gear has a fourth diameter. The fourth diameter is slightly less than the third diameter with the fifth diameter being less than the fourth. Each of the gears is housed within the tri-lobed aperture of the lower gear plate. A seal 84 is located between the base plate and the lower gear plate. The pump has a pair of alignment pins 86.

The pump has a spacer plate 88. The spacer plate has a plurality of pin holes, shaft holes, a material flow hole, and bolt holes there through. The spacer plate has a plurality of temperature sensor recesses 90 there into. There is a seal 92 located between the lower gear plate and the spacer plate. The idler shaft passes through a shaft hole in the spacer plate and through the shaft hole of the lower gear plate. The drive shaft passes through a shaft hole in the spacer plate and the shaft hole of the lower drive gear.

The pump has an upper gear plate 94 having a rectilinear configuration with an upper surface and a lower surface with a side edge having a thickness there between. The upper gear plate has a tri-lobed aperture 96 there through with each of the lobes having a third diameter. The upper gear plate has an outlet 98 on the edge. The outlet communicates with the tri-lobed aperture.

The pump has a pair of upper gears, with each gear having an external fourth diameter and a shaft hole there through. The shaft hole has a fifth diameter. The gears are a drive gear 100, which is coupled to the drive shaft, and an idler gear 102, which is coupled to the idler shaft. The gears are housed within the tri-lobed aperture of the upper gear plate.

The pump has a top plate 104. The top plate has an upper surface and a lower surface with a side edge having a thickness there between. The lower surface of the top plate has a plurality of pin recesses and bearing recesses there in. The top plate also has a plurality of screw holes there through. There is a seal positioned between the top plate and the upper gear plate.

The pump has a plurality of heating plates 106 that are coupled to the sides of the assembled pump to provide heat to the pump and the material as it passes through the pump. The pump has a plurality of temperature sensors 108 coupled to the temperature sensor recesses.

The pump drive shaft is sized to pass through the drive gears and plates and to be received by an upper and lower bearing. The pump also has a plurality of bolts 110 to couple the plates to each other. The pump is coupled to the platen outflow coupling and is positioned to receive material from the container. The pump has an outlet manifold plate 112 for coupling with each of the outlets of the lower gear plate and the upper gear plate to form a single outlet 114. As configured, each pump may generate a second pressure, reaching 1000 PSI.

In an alternate embodiment the pump may have an outlet manifold for each outlet 116.

In an alternate embodiment the pump may be assembled without the use of seals between the plates, or a seal around the pump drive shaft.

In an alternate embodiment the pump has have only a single set of gears and no spacer plate. Such a configuration would be a single gear, single outlet pump.

All pump configurations utilize what is known as "plate technology", meaning the components of the pump are fabricated of flat plates of metal or other rigid material. The disassembly of the pump allows for easy cleaning and sterilization. The simple flattened surfaces are easy to re-assembly, and hence, make use more convenient and time economical.

Pumps may be used in any one of a variety of configurations, as a solitary pump or in conjunction with another pump, depending on flow volume and pressure needed for a specific application. The number of outflows needed for a specific application will guide the user in determining how to configure the pumps in relation with one another. It should be noted that the "dual gear" description means a dual set of gears, as the gears function together to effectuate the pumping action of the device. Dual gear means a pump has two sets of gears. A single gear pump has a single set of gears.

Next provided is a primary feed hose 120 having an inflow end 122 and an outflow end 124. The inflow end of the hose is coupled with a clamp 126 to the outlet of the dual geared single outlet material pump. The hose has a central pathway 128 there through to allow the passage of material through the hose. The hose has an inner layer 130 forming a smooth inner surface of the hose pathway and an armored crush-resistant outer layer 132. The hose has a heating layer 134 disposed between the inner layer and the outer layer. The heating layer is coupled to a power source by a wire 136. The hose has a pair of hollow tubular fittings 138. Each of the fittings has a smooth inner surface with the surface having a radius beveled inlet 140 to reduce the area of diminished flow within the hose. Each of the fittings has a stepped outer surface 144 to provide a gripping surface thereto. The fitting and the hose are coupled with an external clamp 146. The clamp is held together by a plurality of bolts 142.

Next provided is a secondary container 150 of a polymer having a second volume. The second volume is substantially less than the first volume. The polymer is solid at a first, ambient temperature and flowable at a second, heated temperature. The container has a second height and a fifth diameter. The second container is coupled with a clamp to the outflow end of the primary feed hose.

Next provided is an intermediate output supply assembly 152 having a second control panel 154. The assembly has a horizontal base 156 for the receipt of a container of polymer film material. The assembly has a plurality of vertical hydraulic cylinders 158 and a cross member 160 coupling with the vertical hydraulic cylinders, or, in an alternate embodiment, pneumatic cylinders, with the cross member maintaining the vertical cylinders in alignment. The supply assembly has a drive subassembly 162. The drive subassembly has a motor 164 providing a hydraulic force to the vertical hydraulic cylinders.

In an alternate embodiment, the motor may provide a pneumatic source for the vertical pneumatic cylinders.

The hydraulic source is coupled to the cross member. The drive subassembly has at least one thrust shaft 166 coupled to the cross member. The hydraulic source provides a hydraulic force to the hydraulic cylinders and thereby provides an upward and downward movement of the thrust shaft.

The intermediate output supply assembly produces a first pressure to drive the polymer through the system. While the material is fed from the pump the intermediate assembly does not produce any pressure. When the pump associated with the first container no longer produces pressure, as when the first container is empty, the intermediate system begins to compress and pressurize the polymer material in the second container.

In an alternate embodiment the cylinders may be operated by a pneumatic power source.

The drive subassembly also has a 168 platen. The platen is coupled to the thrust shaft and is moveable in a upward and downward direction. The platen has a generally round disk shape having a sixth diameter. The sixth diameter is less than the fifth diameter. The platen of the second container is configured as is the platen of the first container, but with smaller dimensions. The platen has a heating component there within. The platen has a lower portion with a flat upper surface and a concave lower surface. The platen has a thickness forming an edge and has at least one O-ring coupled there to. The platen has a centrally located hole there through from the upper surface of the upper portion to the lower surface of the lower portion to provide a passageway there through. The platen has an electrical coupling to provide energy to the heating element there within. The platen has an outflow coupling located on the upper surface, with the coupling communicating with the passageway through the platen. The motor of the subassembly moves the platen downward against the polymer in the container.

Next provided is a dual gear, dual outlet material pump. The dual gear, dual outlet material pump is configured like the dual gear, single outlet material pump that is associated with the first container. The first pump provides flow to a single hose and the second, dual outlet material pump provides flow to a plurality of hoses. Other than the single outlet manifold 112 replacing the dual outlet manifolds 116 of the dual outlet pump, the pumps are the same in that the pump comprises a rectilinear base plate having an upper surface and a lower surface with a side edge having a thickness there between. The base plate has an inflow opening there through. The upper surface of the base plate has a plurality of pin recesses, threaded screw recesses, and bearing recesses there in. The pump has a lower gear plate. The lower gear plate has a rectilinear configuration with an upper surface and a lower surface with a side edge having a thickness there between. The lower gear plate has a tri-lobed aperture there through with each of the lobes having a third diameter. The lower gear plate has an outlet on the edge with an outlet stub coupled there to. The outlet communicates with the tri-lobed aperture. The pump has a pair of lower gears, a drive gear and an idler gear. Each gear has a fourth diameter. The fourth diameter being slightly less than the third diameter. The gears each have an associated gear bearing and each gear is housed within the tri-lobed aperture of the lower gear plate. Each of the gears has a shaft hole there through. The pump has a seal located between the base plate and the lower gear plate. The pump has a pair of alignment pins.

The pump has a spacer plate, with the plate having a plurality of pin holes, shaft holes, a material flow hole, and bolt holes there through. The spacer plate has a plurality of temperature sensor recesses there into. The pump has a seal located between the lower gear plate and the spacer plate. The idler shaft passes through a shaft hole in the spacer plate and the shaft hole of the lower idler gear.

The pump has an upper gear plate that has a rectilinear configuration with an upper surface and a lower surface with a side edge having a thickness there between. The upper gear plate has a tri-lobed aperture located there through with each of the lobes having a third diameter. The upper gear plate has an outlet on the edge with an outlet stub coupled there to. The outlet communicates with the tri-lobed aperture. The upper gear plate has an associated pair of upper gears, being a drive gear and an idler gear. Each gear has a fourth diameter. The fourth diameter being slightly less than the third diameter. The gears each has an associated gear bearing. Each gear is housed within the tri-lobed aperture of the upper gear plate. Each of the gears has a shaft hole there through.

The pump has a top plate having an upper surface and a lower surface with a side edge having a thickness there between. The lower surface of the top plate has a plurality of pin recesses and bearing recesses there in. The top plate also has a plurality of screw holes there through and a drive shaft hole there through. There is a drive shaft that has an associated seal retainer. The drive shaft is sized to pass through the drive gears and plates, to be received by a bearing. There is a seal being positioned between the top plate and the upper gear plate. The pump has a plurality of heating plates that are coupled to the sides of the assembled pump to provide heat to the pump and the material as it passes through the pump. There is a plurality of temperature sensors coupled to the temperature sensor recesses.

The pump also has a plurality of bolts to couple the plates to each other. The pump is coupled to the platen hole and is positioned to receive material from the container.

Next provided is a pair of secondary feed hoses 250. Each hose has an inflow end 252 and an outflow end 254. The inflow end of each hose is coupled with a clamp to the one of the outlets of the dual geared dual outlet material pump. Each of the hoses has a central pathway there through to allow the passage of material through the hose. Each of the hoses has an inner layer forming a smooth inner surface of the hose pathway and an armored crush-resistant outer layer. There is a heating layer disposed between the inner layer and the outer layer. The heating layer is coupled to a power source 139 by a wire. Each of the hoses has a pair of hollow tubular fittings. The fittings each have a smooth inner surface having a radius beveled inlet to reduce the area of diminished flow within the hose. The fittings each have a stepped outer surface to provide a gripping surface thereto. The fitting and the hose are coupled with an external clamp.

Next provided is a pair of filters 280. Each filter has an inlet 282 and an outlet 284. Each filter has a plurality of filter elements 286 associated there with. The inlet and outlet each have an associated cone shaped connector 288 that is coupled to the filter body. The filter body 289 is centrally located and has associated O-rings 290. The inlet of each of the filters is coupled with a clamp to the outflow end of each of the secondary feed hoses.

Next provided is a pair of injection valves 300. Each valve has a material inflow end 302 with a material inflow aperture 304. Each valve is coupled to the outlet of a filter. The inflow end of the valve has an outflow aperture 306 having a seventh diameter. Each valve has a pressurized end 308 with a pressure inflow aperture 310 and a pressure cavity 312. The pressure cavity has a piston subassembly 314.

The inflow end of the injection valve has a valve subassembly 316 there within. The valve subassembly comprises a valve pin 318 with a head having an eighth diameter, with the eighth diameter being slightly smaller than the seventh diameter. The pin is sized to block the outflow aperture. The valve pin has an associated spring 320 and pin contact shaft 322. The inflow end of the injection valve is separated from the pressurized end of the injection valve by a diaphragm 324.

The piston subassembly 314 has a piston 328, an associated piston shaft 330, and a plurality of associated O-rings 332. The piston shaft contacts the valve pin contact shaft, and when a third pressure is introduced into the pressurized end the piston is moved toward the inflow end of the injection valve. The movement thereby effectuates the movement of the valve pin to an open position allowing material within the inflow end of the injection valve to move outward through the outflow aperture. When the pressure in the pressurized end of the injection valve drops, the valve pin spring moves the valve pin to the closed position.

Next provided is a third pressure source 340 that is coupled to the pressurized end of the injection valve by a pressure line 341.

In an alternate embodiment the pressure source may be hydraulic or pneumatic.

It should be noted that the third pressure is greater than the second pressure, and the second pressure is greater than the first pressure.

Next provided is a plurality of dies 350 of a similar configuration. Each material feed aperture of each die is coupled to an outflow aperture of an injection valve.

First provided is a mounting plate 352. The mounting plate has a rectilinear configuration. The mounting plate has a plurality of bolt holes there through. The mounting plate also has a plurality of die mounting holes there through.

Next provided is a distribution plate 354. The distribution plate has a generally rectilinear configuration and is oriented perpendicular to the mounting plate. The distribution plate has an outside and an inside and a thickness with an edge there between. The edge of the distribution plate has a material feed aperture 356 and a material feed tube coupled there to for the receipt of liquid polymer. The distribution plate has a plurality of bolt holes there through for coupling of the distribution plate.

The die has a U-shaped shim 362 having a plurality of bolt holes there through. The shim is coupled to the distribution plate. The shim has the opening 364 of the U, being an extrusion opening, located in a downwardly direction a heater plate.

The die has a first insulator dielectric plate 360 having a generally rectilinear configuration and a plurality of bolt holes there through. The dielectric plate has an aperture 361 for the receipt of a temperature sensor 363 there in.

The die has a heating element 358. The heating element has a generally rectilinear configuration. The heating element has an electrical connector 359 for receiving power.

The die has a second insulator dielectric plate 365. The second dielectric plate has a generally rectilinear configuration and a plurality of bolt holes there through.

The die also has an end plate 366. The end plate has a generally rectilinear configuration with an inside 368 and an outside 370 and an edge 372 there between. The inside of the plate has a plurality of threaded bolt holes for receiving bolts. The inside of the end plate also has a plurality of locator pins 373 coupled there to. The end plate has bolt holes on the upper edge to align with the bolt holes of the mounting plate.

The die also has a plurality of spacers 375 associated with the mounting plate and the end plate.

Lastly, the system has a plurality of bolts 377 to couple the components of the die.

Next provided is a polymer dispensing assembly 370 having a control box 372 and a motor 374. The dispensing assembly has a plurality of dies coupled there to. The dispensing assembly has a pair of cooled roller-conveyors 376 that are rotatable about parallel axes. The exterior surfaces of each of the roller conveyers is positioned immediately beneath the U-shaped opening of the shim of each of the dies.

The dispensing assembly has a pair of rotary dies 378 having a texture 401. The rotary dies each have axes parallel with each other. The axes of the rotary dies are located between the cooled roller-conveyors. The rotary dies are in a closely spaced relationship with each other and have circumferential pressure surfaces.

The polymer dispensing assembly has a positive displacement pumping device 391 and control 393 providing dial-in incremental, thermal and precise dosage control. The positive displacement pumping device is located above the rotary dies and provides for the periodic dispensing of particulate materials between packets formed with the solidification of the polymer moving between the rotary dies.

Lastly provided is a master control panel 380 coupling the output master supply assembly, the dual gear, single outlet material pump, the primary and secondary hoses, the intermediate output supply assembly, the dual gear, dual outlet material pump and the polymer dispensing assembly for continuous and automatic control of the speed of the pump and the rate of rotation of the cooled rollers. The master control panel also controls the heat of the tube, the platen, and the dies.

The above described system allows for easy disassembly, easy validatable cleaning, and rapid reassembly. Validatable cleaning means that visual inspection of the plates of the components can be readily carried out to insure that all material has been removed from the surfaces of the components. Swabs for culture can be easily taken and the cleanliness of the device, prior to assembly, can be readily documented.

A method of constructing a sanitary precision polymer film casting and dispersion injection system for creating individual containers of particulate material in a safe and economical manner is disclosed. The method comprises several steps, in combination.

The first step is providing a container of a polymer having a first volume. The polymer is used as a coating for a substrate or compound. The polymer is a solid at a first, ambient temperature and flowable at a second, heated temperature. The container has a first height and a first diameter.

The next step is providing an output master supply assembly having a first control panel, whereby the operation of the system may be controlled with precision. The assembly has a horizontal base for the receipt of a container of polymer film material. The assembly has a plurality of vertical hydraulic cylinders. The assembly has a pair of cross members coupling with the vertical hydraulic cylinders for maintaining the vertical cylinders in alignment. The supply assembly has a drive subassembly. The drive subassembly has an upper platform that is fixedly coupled to the cross members and located a second distance from the horizontal base. The second distance is greater than the first height. A hydraulic source is coupled to upper platform. The drive subassembly has a plurality of thrust shafts, with the thrust shafts slidably coupled to the cross members. The hydraulic source provides an upward and a downward movement of the vertical hydraulic cylinders and the thrust shafts. The drive subassembly also has a platen. The platen is disposed beneath the upper platform. The platen is coupled to the thrust shafts and is moveable in an upward and a downward direction relative to the platform. The platen has a generally round disk shape having a second diameter. The second diameter is less than the first diameter. The platen comprises an upper portion having a flat upper surface and a recessed lower surface having a heating component there within. The lower portion has a flat upper surface and a concave lower surface. The platen has a thickness forming an edge, and the platen has an O-ring coupled there to. The platen has a centrally located hole there through, from the upper surface of the upper portion to the lower surface of the lower portion to provide a passageway there through. The platen has an electrical coupling to provide energy to the heating element there within. The platen has an outflow coupling located on the upper surface with the coupling communicating with the passageway through the platen. The motor of the subassembly moves the platen downward against the polymer in the container.

The next step is providing is a dual gear, single outlet material pump to move the material from one location in the system to another location in the system. The pump comprises a rectilinear base plate having an upper surface and a lower surface with a side edge having a thickness there between. The base plate has an inflow opening there through. The upper surface of the base plate has a plurality of pin recesses, threaded screw recesses and bearing recesses there in. The pump has a lower gear plate having a rectilinear configuration with an upper surface and a lower surface with a side edge having a thickness there between. The lower gear plate has a tri-lobed aperture there through with each of the lobes having a third diameter. The lower gear plate has an outlet on the edge, the outlet communicating with the tri-lobed aperture. The pump has an idler shaft and a drive shaft. Each shaft has a fifth external diameter. The idler shaft has an associated upper and lower bearing. The drive shaft has an associated upper and lower bearing. The pump has a pair of lower gears with each having a shaft hole there through. The pump has a drive gear and an idler gear. Each gear has a fourth diameter. The fourth diameter is slightly less than the third diameter with the fifth diameter being less than the fourth. Each of the gears is housed within the tri-lobed aperture of the lower gear plate. A seal is located between the base plate and the lower gear plate. The pump has a pair of alignment pins. The pump has a spacer plate. The spacer plate has a plurality of pin holes, shaft holes, a material flow hole, and bolt holes there through. The spacer plate has a plurality of temperature sensor recesses there into. There is a seal located between the lower gear plate and the spacer plate. The idler shaft passes through a shaft hole in the spacer plate and through the shaft hole of the lower gear plate. The drive shaft passes through a shaft hole in the spacer plate and the shaft hole of the lower drive gear. The pump has an upper gear plate having a rectilinear configuration with an upper surface and a lower surface with a side edge having a thickness there between. The upper gear plate has a tri-lobed aperture there through with each of the lobes having a third diameter. The upper gear plate has an outlet on the edge. The outlet communicates with the tri-lobed aperture. The pump has a pair of upper gears, with each gear having an external fourth diameter and a shaft hole there through. The shaft hole has a fifth diameter. The gears are a drive gear, which is coupled to the drive shaft, and an idler gear, which is coupled to the idler shaft. The gears are housed within the tri-lobed aperture of the upper gear plate. The pump has a top plate. The top plate has an upper surface and a lower surface with a side edge having a thickness there between. The lower surface of the top plate has a plurality of pin recesses and bearing recesses there in. The top plate also has a plurality of screw holes there through. There is a seal positioned between the top plate and the upper gear plate. The pump has a plurality of heating plates that are coupled to the sides of the assembled pump to provide heat to the pump and the material as it passes through the pump. The pump has a plurality of temperature sensors coupled to the temperature sensor recesses. The pump drive shaft is sized to pass through the drive gears and plates and to be received by an upper and lower bearing. The pump also has a plurality of bolts to couple the plates to each other. The pump is coupled to the platen outflow coupling and is positioned to receive material from the container. The pump has an outlet manifold plate for coupling with each of the outlets of the lower gear plate and the upper gear plate to form a single outlet.

The next step is providing a primary feed hose having an inflow end and an outflow end, whereby material is carried from one location to another location. The inflow end of the hose is coupled with a clamp to the outlet of the dual geared single outlet material pump. The hose has a central pathway there through to allow the passage of material through the hose. The hose has an inner layer forming a smooth inner surface of the hose pathway and an armored crush-resistant outer layer. The hose has a heating layer disposed between the inner layer and the outer layer. The heating layer is coupled to a power source by a wire. The hose has a pair of hollow tubular fittings. Each of the fittings has a smooth inner surface with the surface having a radius beveled inlet to reduce the area of diminished flow within the hose. Each of the fittings has a stepped outer surface to provide a gripping surface thereto.

The next step is providing a secondary container of a polymer having a second volume. The purpose of the second container is to provide a reservoir to continue system operation in the condition that the first container is emptied. The second volume is substantially less than the first volume. The polymer is solid at a first, ambient temperature and flowable at a second, heated temperature. The container has a second height and a fifth diameter. The second container is coupled with a clamp to the outflow end of the primary feed hose.

The next step is providing an intermediate output supply assembly having a second control panel, whereby material movement, temperature and flow may be controlled. The assembly has a horizontal base for the receipt of a container of polymer film material. The assembly has a plurality of vertical hydraulic cylinders and a cross member coupling with the vertical hydraulic cylinders with the cross member maintaining the vertical hydraulic cylinders in alignment. The supply assembly has a drive subassembly. The drive subassembly has a motor providing a hydraulic force to the vertical hydraulic cylinders. There is a hydraulic source that is coupled to the cross member. The drive subassembly has at least one thrust shaft coupled to the cross member. The hydraulic source provides a hydraulic force to the hydraulic cylinders and thereby provides an upward and downward movement of the thrust shaft. The drive subassembly also has a platen. The platen is coupled to the thrust shaft and is moveable in a upward and downward direction. The platen has a generally round disk shape having a sixth diameter. The sixth diameter is less than the fifth diameter. The platen comprises an upper portion having a flat upper surface and a recessed lower surface. The platen has a heating component there within. The platen has a lower portion with a flat upper surface and a concave lower surface. The platen has a thickness forming an edge and has at least one O-ring coupled there to. The platen has a centrally located hole there through from the upper surface of the upper portion to the lower surface of the lower portion to provide a passageway there through. The platen has an electrical coupling to provide energy to the heating element there within, and an outflow coupling located on the upper surface and communicating with the passageway through the platen. The motor of the subassembly moves the platen downward against the polymer in the container.

The next step is providing a dual gear, dual outlet material pump, whereby the single flow is accurately divided into two flow lines. The pump comprises a rectilinear base plate having an upper surface and a lower surface with a side edge having a thickness there between. The base plate has an inflow opening there through. The upper surface of the base plate has a plurality of pin recesses, threaded screw recesses, and bearing recesses there in. The pump has a lower gear plate. The lower gear plate has a rectilinear configuration with an upper surface and a lower surface with a side edge having a thickness there between. The lower gear plate has a tri-lobed aperture there through with each of the lobes having a third diameter. The lower gear plate has an outlet on the edge with an outlet stub coupled there to. The outlet communicates with the tri-lobed aperture. The pump has a pair of lower gears, a drive gear and an idler gear. Each gear has a fourth diameter. The fourth diameter being slightly less than the third diameter. The gears each have an associated gear bearing and each gear is housed within the tri-lobed aperture of the lower gear plate. Each of the gears has a shaft hole there through. The pump has a seal located between the base plate and the lower gear plate. The pump has a pair of alignment pins. The pump has a spacer plate, with the plate having a plurality of pin holes, shaft holes, a material flow hole, and bolt holes there through. The spacer plate has a plurality of temperature sensor recesses there into. The pump has a seal located between the lower gear plate and the spacer plate. The idler shaft passes through a shaft hole in the spacer plate and the shaft hole of the lower idler gear. The pump has an upper gear plate that has a rectilinear configuration with an upper surface and a lower surface with a side edge having a thickness there between. The upper gear plate has a tri-lobed aperture located there through with each of the lobes having a third diameter. The upper gear plate has an outlet on the edge with an outlet stub coupled there to. The outlet communicates with the tri-lobed aperture. The upper gear plate has an associated pair of upper gears, being a drive gear and an idler gear. Each gear has a fourth diameter. The fourth diameter being slightly less than the third diameter. The gears each has an associated gear bearing. Each gear is housed within the tri-lobed aperture of the upper gear plate. Each of the gears has a shaft hole there through. The pump has a top plate having an upper surface and a lower surface with a side edge having a thickness there between. The lower surface of the top plate has a plurality of pin recesses and bearing recesses there in. The top plate also has a plurality of screw holes there through and a drive shaft hole there through. There is a drive shaft that has an associated seal retainer. The drive shaft is sized to pass through the drive gears and plates, to be received by a bearing. There is a seal being positioned between the top plate and the upper gear plate. The pump has a plurality of heating plates that are coupled to the sides of the assembled pump to provide heat to the pump and the material as it passes through the pump. There is a plurality of temperature sensors coupled to the temperature sensor recesses. The pump also has a plurality of bolts to couple the plates to each other. The pump is coupled to the platen hole and is positioned to receive material from the container.

The next step is providing a pair of secondary feed hoses, whereby material is carried from one location to another location. Each hose has an inflow end and an outflow end. The inflow end of each hose is coupled with a clamp to the one of the outlets of the dual geared dual outlet material pump. Each of the hoses has a central pathway there through to allow the passage of material through the hose. Each of the hoses has an inner layer forming a smooth inner surface of the hose pathway and an armored crush-resistant outer layer. There is a heating layer disposed between the inner layer and the outer layer. The heating layer is coupled to a power source by a wire. Each of the hoses has a pair of hollow tubular fittings. The fittings each have a smooth inner surface having a radius beveled inlet to reduce the area of diminished flow within the hose. The fittings each have a stepped outer surface to provide a gripping surface thereto.

The next step is providing a pair of filters to filter out impurities in the line material. Each filter has an inlet and an outlet. Each filter has a plurality of filter elements associated there with. The inlet and outlet each have an associated cone shaped connector that is coupled to the filter body. The filter body is centrally located and has associated O-rings. The inlet of each of the filters is coupled with a clamp to the outflow end of each of the secondary feed hoses.

The next step is providing a pair of injection valves, the valves providing a precise control over the amount of polymer being utilized per operation. Each valve has a material inflow end with a material inflow aperture. Each valve is coupled to the outlet of a filter. The inflow end of the valve has an outflow aperture having a seventh diameter. Each valve has a pressurized end with a pressure inflow aperture and a pressure cavity. The pressure cavity has a piston subassembly. The inflow end of the injection valve has a valve subassembly there within. The valve subassembly comprises a valve pin with a head having an eighth diameter, with the eighth diameter being slightly smaller than the seventh diameter. The pin is sized to block the outflow aperture. The valve pin has an associated spring and pin contact shaft. The inflow end of the injection valve is separated from the pressurized end of the injection valve by a diaphragm. The piston subassembly has a piston, an associated piston shaft, and a plurality of associated O-rings. The piston shaft contacts the valve pin contact shaft, and when pressure is introduced into the pressurized end the piston is moved toward the inflow end of the injection valve. The movement thereby effectuates the movement of the valve pin to an open position allowing material within the inflow end of the injection valve to move outward through the outflow aperture. When the pressure in the pressurized end of the injection valve drops, the valve pin spring moves the valve pin to the closed position.

The next step is providing a pressure source that is coupled to the pressurized end of the injection valve, with the pressure source providing an operational force for the injection valves.

The next step is providing a plurality of dies of a similar configuration. The dies dispense a precise amount of polymer in an exact location. Each of the dies has a mounting plate and a distribution plate parallel with the mounting plate. The distribution plate has an upper edge with a material feed aperture for the receipt of liquid polymer. Each die has a heater plate. There is an insulator dielectric plate between the heater and the mounting plate. There is a shim in an inverted U-shaped configuration adjacent to the distribution plate and an extrusion face between the shim and the heater. All die plates have a generally rectilinear configuration with an upper edge, a lower edge and side edges there between whereby polymer may be fed through the distribution plate there through the opening in the shim. Each material feed aperture of each die is coupled to an outflow aperture of an injection valve.

The next step is providing a polymer dispensing assembly having a control box and a motor to provide precise control over the functions of the system. The assembly has a plurality of dies coupled there to. The dispensing assembly has a pair of cooled roller-conveyors that are rotatable about parallel axes. The exterior surfaces of each of the roller conveyers is positioned immediately beneath the shim of each of the dies. The dispensing assembly has a pair of rotary dies. The rotary dies each have axes parallel with each other. The axes of the rotary dies are located between the roller-conveyors. The rotary dies are in a closely spaced relationship with each other and have circumferential pressure surfaces. The polymer dispensing assembly has a positive displacement pumping device providing dial-in incremental, thermal and precise dosage control. The positive displacement pumping device is located above the rotary dies and provides for the periodic dispensing of particulate materials between packets formed with the solidification of the polymer moving between the rotary dies.

The last step is coupling, through a master control panel, the output master supply assembly, the dual gear, single outlet material pump, the primary and secondary hoses, the intermediate output supply assembly, the dual gear, dual outlet material pump and the polymer dispensing assembly for continuous and automatic control of the speed of the pump and the rate of rotation of the rollers. The master control panel also controls the heat of the tube, the platen, and the dies.

The steps so providing the necessary components of the system whereby a precisely controlled, easily maintained system can dispense a polymer.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A method of constructing a sanitary precision polymer film casting and dispersion injection system for creating individual containers of particulate material in a safe and economical manner comprising, in combination:

providing a container of a polymer having a first volume, the polymer being solid at a first, ambient temperature and flowable at a second, heated temperature, the container having a first height and a first diameter;

providing an output master supply assembly having a first control panel, the assembly having a horizontal base for the receipt of a container of polymer film material and a plurality of vertical telescoping cylinders, a pair of cross members coupling with the vertical cylinders for maintaining the vertical cylinders in alignment, the supply assembly having a drive subassembly, the drive subassembly having an upper platform being fixedly coupled to the cross members and located a second distance from the horizontal base, with the second distance being greater than the first height, a pressure source being coupled to upper platform, the drive subassembly having a plurality of thrust shafts with the thrust shafts slidably coupled to the cross members, the pressure source providing an upward and a downward movement of the vertical pressure cylinders and the thrust shafts, the drive subassembly also having a platen, the platen being disposed beneath the upper platform with the platen being coupled to the thrust shafts and being moveable in an upward and a downward direction relative to the platform, the platen having a generally round disk shape having a second diameter, the second diameter being less than the first diameter, the platen comprising an upper portion having a flat upper surface and a recessed lower surface having a heating component there within and lower portion having a flat upper surface and a concave lower surface, the platen having a thickness forming an edge and having an O-ring coupled there to, the platen having a centrally located hole there through from the upper surface of the upper portion to the lower surface of the lower portion to provide a passageway there through, the platen having an electrical coupling to provide energy to the heating element there within and an outflow coupling located on the upper surface with the coupling communicating with the passageway through the platen, the motor of the subassembly moving the platen downward against the polymer in the container thereby producing a first pressure within the polymer;

providing a dual gear, single outlet material pump comprising a rectilinear base plate having an upper surface and a lower surface with a side edge having a thickness there between with the base plate having an inflow opening there through, the upper surface of the base plate having a plurality of pin recesses and threaded screw recesses and bearing recesses there in, a lower gear plate having a rectilinear configuration with an upper surface and a lower surface with a side edge having a thickness there between, the lower gear plate having a tri-lobed aperture there through with each of the lobes having a third diameter, the lower gear plate having an outlet on the edge, the outlet communicating with the tri-lobed aperture, the pump having an idler shaft and a drive shaft, each shaft having a fifth external diameter, with the idler shaft having an associated upper and lower bearing and the drive shaft having an associated upper and lower bearing, the pump having a pair of lower gears with each having a shaft hole there through, the gears being a drive gear and an idler gear, each gear having a fourth diameter, the fourth diameter being slightly less than the third diameter with the fifth diameter being less than the fourth, each of the gears being housed within the tri-lobed aperture of the lower gear plate, a seal being located between the base plate and the lower gear plate, a pair of alignment pins, a spacer plate having a plurality of pin holes and shaft holes and a material flow hole and bolt holes there through and a plurality of temperature sensor recesses there into, a seal located between the lower gear plate and the spacer plate, with the idler shaft passing through a shaft hole in the spacer plate and the shaft hole of the lower idler gear and the drive shaft passing through a shaft hole in the spacer plate and the shaft hole of the lower drive gear, an upper gear plate having a rectilinear configuration with an upper surface and a lower surface with a side edge having a thickness there between, the upper gear plate having a tri-lobed aperture there through with each of the lobes having a third diameter, the upper gear plate having an outlet on the edge, the outlet communicating with the tri-lobed aperture, a pair of upper gears with each gear having an external fourth diameter and a shaft hole there through, the shaft hole having a fifth diameter, the gears being a drive gear which is coupled to the drive shaft and an idler gear which is coupled to the idler shaft, the gears being housed within the tri-lobed aperture of the upper gear plate, a top plate having an upper surface and a lower surface with a side edge having a thickness there between, the lower surface of the top plate having a plurality of pin recesses and bearing recesses there in, the top plate also having a plurality of screw holes there through, a seal being positioned between the top plate and the upper gear plate, a plurality of heating plates being coupled to the sides of the assembled pump to provide heat to the pump and the material as it passes through the pump, a plurality of temperature sensors coupled to the temperature sensor recesses, the pump drive shaft being sized to pass through the drive gears and plates and to be received by an upper and lower bearing, and the pump also having a plurality of bolts to couple the plates to each other, the pump coupled to the platen outflow coupling and being positioned to receive material from the container, the pump having an outlet plate for coupling with each of the outlets of the lower gear plate and the upper gear plate to form a single outlet, the pump producing a second pressure within the polymer;

providing a primary feed hose having an inflow end and an outflow end with the hose being coupled with a clamp on the inflow end to outlet of the dual geared single outlet material pump, the hose having a central pathway there through to allow the passage of material through the hose, the hose having an inner layer forming a smooth inner surface of the hose pathway and an armored crush-resistant outer layer and a heating layer disposed there between, the heating layer coupled to a power source by a wire, the hose having a pair of hollow tubular fittings, with the fittings having a smooth inner surface having a radius beveled inlet to reduce the area of diminished flow within the hose and a stepped outer surface to provide a gripping surface thereto;

providing a secondary container of a polymer having a second volume with the second volume being substantially less than the first volume, the polymer being solid at a first, ambient temperature and flowable at a second, heated temperature, the container having a second height and a fifth diameter, the second container being coupled with a clamp to the outflow end of the primary feed hose;

providing an intermediate output supply assembly having a second control panel, the assembly having a horizontal base for the receipt of a container of polymer film material, and a plurality of vertical telescoping cylinders, a cross member coupling with the vertical telescoping cylinders for maintaining the vertical cylinders in alignment, the supply assembly having a drive subassembly, the drive subassembly having a motor providing a pressure force to the vertical cylinders, the pressure source being coupled to the cross member, the drive subassembly having at least one thrust shaft coupled to the cross member, the pressure source providing a pressure force to the telescoping cylinders and thereby providing an upward and downward movement of the thrust shaft, the drive subassembly also having a platen, the platen being coupled to the thrust shaft and being moveable in a upward and downward direction, the platen having a generally round disk shape having a sixth diameter, the sixth diameter being less than the fifth diameter, the platen comprising an upper portion having a flat upper surface and a recessed lower surface having a heating component there within and lower portion having a flat upper surface and a concave lower surface, the platen having a thickness forming an edge and having an O-ring coupled there to, the platen having a centrally located hole there through from the upper surface of the upper portion to the lower surface of the lower portion to provide a passageway there through, the platen having an electrical coupling to provide energy to the heating element there within and an outflow coupling located on the upper surface and communicating with the passageway through the platen, the motor of the subassembly moving the platen downward against the polymer in the container producing a first pressure;

providing a dual gear, dual outlet material pump comprising a rectilinear base plate having an upper surface and a lower surface with a side edge having a thickness there between with the base plate having an inflow opening there through, the upper surface of the base plate having a plurality of pin recesses and threaded screw recesses and bearing recesses there in, a lower gear plate having a rectilinear configuration with an upper surface and a lower surface with a side edge having a thickness there between, the lower gear plate having a tri-lobed aperture there through with each of the lobes having a third diameter, the lower gear plate having an outlet on the edge with an outlet stub coupled there to, the outlet communicating with the tri-lobed aperture, a pair of lower gears being a drive gear and an idler gear, each having a fourth diameter, the fourth diameter being slightly less than the third diameter, the gears each having an associated gear bearing and each being housed within the tri-lobed aperture of the lower gear plate, each of the gears having a shaft hole there through, a seal being located between the base plate and the lower gear plate, a pair of alignment pins, a spacer plate having a plurality of pin holes and shaft holes and a material flow hole and bolt holes there through and a plurality of temperature sensor recesses there into, a seal located between the lower gear plate and the spacer plate with an idler shaft passing through a shaft hole in the spacer plate and the shaft hole of the lower idler gear, an upper gear plate having a rectilinear configuration with an upper surface and a lower surface with a side edge having a thickness there between, the upper gear plate having a tri-lobed aperture located there through with each of the lobes having a third diameter, the upper gear plate having an outlet on the edge with an outlet stub coupled there to, the outlet communicating with the tri-lobed aperture, a pair of upper gears being a drive gear and an idler gear, each gear having a fourth diameter, the fourth diameter being slightly less than the third diameter, the gears each having an associated gear bearing and each being housed within the tri-lobed aperture of the upper gear plate, each of the gears having a shaft hole there through, a top plate having an upper surface and a lower surface with a side edge having a thickness there between, the lower surface of the top plate having a plurality of pin recesses and bearing recesses there in, the top plate also having a plurality of screw holes there through and a drive shaft hole there through, with a drive shaft having an associated seal retainer, the drive shaft sized to pass through the drive gears and plates and to be received by a bearing, a seal being positioned between the top plate and the upper gear plate, a plurality of heating plates being coupled to the sides of the assembled pump to provide heat to the pump and the material as it passes through the pump, a plurality of temperature sensors coupled to the temperature sensor recesses, the pump also having a plurality of bolts to couple the plates to each other, the pump coupled to the platen hole and being positioned to receive material from the container, the pump producing a second pressure within the polymer;

providing a pair of secondary feed hoses each having an inflow end and an outflow end with the inflow end of each hose being coupled with a clamp to the one of the outlets of the dual geared dual outlet material pump, each of the hoses having a central pathway there through to allow the passage of material through the hose, each of the hoses having an inner layer forming a smooth inner surface of the hose pathway and an armored crush-resistant outer layer and a heating layer disposed there between, the heating layer coupled to a power source by a wire, each of the hoses having a pair of hollow tubular fittings, with the fittings having a smooth inner surface having a radius beveled inlet to reduce the area of diminished flow within the hose and a stepped outer surface to provide a gripping surface thereto;

providing a pair of filters each having an inlet and an outlet with each filter having a plurality of filter elements associated there with, the inlet and outlet each having an associated cone shaped connector being coupled to the filter body, the filter body being centrally located and having associated O-rings, the inlet of each of the filters being coupled with a clamp to the outflow end of each of the secondary feed hoses;

providing a pair of injection valves with each valve having a material inflow end with a material inflow aperture being coupled to the outlet of a filter and the inflow end having an outflow aperture having a seventh diameter, each valve having a pressurized end with a pressure inflow aperture and a pressure cavity, the pressure cavity having a piston subassembly, the inflow end of the injection valve having a valve subassembly there within, the valve subassembly comprising a valve pin with a head having an eighth diameter with the eighth diameter being slightly smaller than the seventh diameter, the pin sized to block the outflow aperture, the valve pin having an associated spring and pin contact shaft, the inflow end of the injection valve being separated from the pressurized end of the injection valve by a diaphragm, the piston subassembly having a piston and an associated piston shaft and a plurality of associated O-rings, the piston shaft contacting the valve pin contact shaft and when pressure is introduced into the pressurized end the piston being moved toward the inflow end of the injection valve and the movement thereby effectuating the movement of the valve pin to an open position allowing material within the inflow end of the injection valve to move outward through the outflow aperture, when the pressure in the pressurized end of the injection valve drops the valve pin spring moves the valve pin to the closed position, the valve producing a third pressure within the polymer;

providing a third pressure source being coupled to the pressurized end of the injection valve;

providing a plurality of dies of similar configuration, each of the dies having a mounting plate and a distribution plate parallel with the mounting plate with the distribution plate having an upper edge with a material feed aperture for the receipt of liquid polymer, each die having a heater plate with an insulator dielectric plate between the heater and the mounting plate and a shim in an inverted U-shaped configuration adjacent to the distribution plate and an extrusion face between the shim and the heater, all die plates having a generally rectilinear configuration with an upper edge, a lower edge and side edges there between whereby polymer may be fed through the distribution plate there through the opening in the shim, each material feed aperture of each die being coupled to an outflow aperture of an injection valve;

providing a polymer dispensing assembly having a control box and a motor, the assembly having a plurality of dies coupled there to, a pair of roller-conveyors rotatable about parallel axes with exterior surfaces of each of the roller-conveyors being positioned immediately beneath the shim of each of the dies, the dispensing assembly having a pair of rotary dies, the rotary dies having axes parallel with each other and the axes of the rotary dies being located between the roller-conveyors, the rotary dies being in closely spaced relationship with each other with circumferential pressure surfaces, the polymer dispensing assembly having a positive displacement pumping device providing dial-in incremental, thermal and precise dosage control located above the rotary dies for the periodic dispensing of particulate materials between packets formed with the solidification of the polymer moving between the rotary dies; and coupling, through a master control panel, the output master supply assembly and dual gear, single outlet material pump and primary and secondary hoses and the intermediate output supply assembly and dual gear, dual outlet material pump and the polymer dispensing assembly, whereby the user has continuous and automatic control of the speed of the pump and the rate of rotation of the rollers and the heat of the tubes and the platen and the dies.

2. A pressurized sanitary precision polymer film casting and dispersion injection system for creating individual containers of particulate material in a safe and economical manner comprising, in combination:

a container of a polymer having a first volume, the polymer being solid at a first, ambient temperature and flowable at a second, heated temperature, the container having a first height and a first diameter;

an output master supply assembly having a first control panel, the assembly having a horizontal base for the receipt of a container of polymer film material and a plurality of vertical telescoping cylinders, a pair of cross members coupling with the vertical cylinders for maintaining the vertical cylinders in alignment, the supply assembly having a drive subassembly, the drive subassembly having an upper platform being fixedly coupled to the cross members and located a second distance from the horizontal base, with the second distance being greater than the first height, a pressure source being coupled to upper platform, the drive subassembly having a plurality of thrust shafts with the thrust shafts slidably coupled to the cross members, the pressure source providing an upward and a downward movement of the vertical telescoping cylinders and the thrust shafts, the drive subassembly also having a platen, the platen being disposed beneath the upper platform with the platen being coupled to the thrust shafts and being moveable in an upward and a downward direction relative to the platform, the platen having a generally round disk shape having a second diameter, the second diameter being less than the first diameter, the platen comprising an upper portion having a flat upper surface and a recessed lower surface having a heating component there within and lower portion having a flat upper surface and a concave lower surface, the platen having a thickness forming an edge and having an O-ring coupled there to, the platen having a centrally located hole there through from the upper surface of the upper portion to the lower surface of the lower portion to provide a passageway there through, the platen having an electrical coupling to provide energy to the heating element there within and an outflow coupling located on the upper surface with the coupling communicating with the passageway through the platen, the motor of the subassembly moving the platen downward against the polymer in the container to generate a pressure within the first container;

a dual gear, single outlet material pump comprising a rectilinear base plate having an upper surface and a lower surface with a side edge having a thickness there between with the base plate having an inflow opening there through, the upper surface of the base plate having a plurality of pin recesses and threaded screw recesses and bearing recesses there in, a lower gear plate having a rectilinear configuration with an upper surface and a lower surface with a side edge having a thickness there between, the lower gear plate having a tri-lobed aperture there through with each of the lobes having a third diameter, the lower gear plate having an outlet on the edge, the outlet communicating with the tri-lobed aperture, the pump having an idler shaft and a drive shaft, each shaft having a fifth external diameter, with the idler shaft having an associated upper and lower bearing and the drive shaft having an associated upper and lower bearing, the pump having a pair of lower gears with each having a shaft hole there through, the gears being a drive gear and an idler gear, each gear having a fourth diameter, the fourth diameter being slightly less than the third diameter with the fifth diameter being less than the fourth, each of the gears being housed within the tri-lobed aperture of the lower gear plate, a seal being located between the base plate and the lower gear plate, a pair of alignment pins, a spacer plate having a plurality of pin holes and shaft holes and a material flow hole and bolt holes there through and a plurality of temperature sensor recesses there into, a seal located between the lower gear plate and the spacer plate, with the idler shaft passing through a shaft hole in the spacer plate and the shaft hole of the lower gear plate and the drive shaft passing through a shaft hole in the spacer plate and the shaft hole of the lower drive gear, an upper gear plate having a rectilinear configuration with an upper surface and a lower surface with a side edge having a thickness there between, the upper gear plate having a tri-lobed aperture there through with each of the lobes having a third diameter, the upper gear plate having an outlet on the edge, the outlet communicating with the tri-lobed aperture, a pair of upper gears with each gear having an external fourth diameter and a shaft hole there through, the shaft hole having a fifth diameter, the gears being a drive gear which is coupled to the drive shaft and an idler gear which is coupled to the idler shaft, the gears being housed within the tri-lobed aperture of the upper gear plate, a top plate having an upper surface and a lower surface with a side edge having a thickness there between, the lower surface of the top plate having a plurality of pin recesses and bearing recesses there in, the top plate also having a plurality of screw holes there through, a seal being positioned between the top plate and the upper gear plate, a plurality of heating plates being coupled to the sides of the assembled pump to provide heat to the pump and the material as it passes through the pump, a plurality of temperature sensors coupled to the temperature sensor recesses, the pump drive shaft being sized to pass through the drive gears and plates and to be received by an upper and lower bearing, and the pump also having a plurality of bolts to couple the plates to each other, the pump coupled to the platen outflow coupling and being positioned to receive material from the container, the pump having an outlet plate for coupling with each of the outlets of the lower gear plate and the upper gear plate to form a single outlet, the pump taking in polymer and outputting the same polymer under a second pressure;

a primary feed hose having an inflow end and an outflow end with the hose being coupled with a clamp on the inflow end to outlet of the dual geared single outlet material pump, the hose having a central pathway there through to allow the passage of material through the hose, the hose having an inner layer forming a smooth inner surface of the hose pathway and an armored crush-resistant outer layer and a heating layer disposed there between, the heating layer coupled to a power source by a wire, the hose having a pair of hollow tubular fittings, with the fittings having a smooth inner surface having a radius beveled inlet to reduce the area of diminished flow within the hose and a stepped outer surface to provide a gripping surface thereto;

a secondary container of a polymer having a second volume with the second volume being substantially less than the first volume, the polymer being solid at a first, ambient temperature and flowable at a second, heated temperature, the container having a second height and a fifth diameter, the second container being coupled with a clamp to the outflow end of the primary feed hose;

an intermediate output supply assembly having a second control panel, the assembly having a horizontal base for the receipt of a container of polymer film material, and a plurality of vertical telescoping cylinders, a cross member coupling with the vertical telescoping cylinders for maintaining the vertical cylinders in alignment, the supply assembly having a drive subassembly, the drive subassembly having a pressure source providing a pressure force to the vertical cylinders, the pressure source being coupled to the cross member, the drive subassembly having at least one thrust shaft coupled to the cross member, the pressure source providing a pressure force to the cylinders and thereby providing an upward and downward movement of the thrust shaft, the drive subassembly also having a platen, the platen being coupled to the thrust shaft and being moveable in a upward and downward direction, the platen having a generally round disk shape having a sixth diameter, the sixth diameter being less than the fifth diameter, the platen comprising an upper portion having a flat upper surface and a recessed lower surface having a heating component there within and lower portion having a flat upper surface and a concave lower surface, the platen having a thickness forming an edge and having an O-ring coupled there to, the platen having a centrally located hole there through from the upper surface of the upper portion to the lower surface of the lower portion to provide a passageway there through, the platen having an electrical coupling to provide energy to the heating element there within and an outflow coupling located on the upper surface and communicating with the passageway through the platen, the pressure source of the subassembly moving the platen downward against the polymer in the container thereby pressurizing the polymer to a first pressure;

a dual gear, dual outlet material pump comprising a rectilinear base plate having an upper surface and a lower surface with a side edge having a thickness there between with the base plate having an inflow opening there through, the upper surface of the base plate having a plurality of pin recesses and threaded screw recesses and bearing recesses there in, a lower gear plate having a rectilinear configuration with an upper surface and a lower surface with a side edge having a thickness there between, the lower gear plate having a tri-lobed aperture there through with each of the lobes having a third diameter, the lower gear plate having an outlet on the edge with an outlet stub coupled there to, the outlet communicating with the tri-lobed aperture, a pair of lower gears being a drive gear and an idler gear, each having a fourth diameter, the fourth diameter being slightly less than the third diameter, the gears each having an associated gear bearing and each being housed within the tri-lobed aperture of the lower gear plate, each of the gears having a shaft hole there through, a seal being located between the base plate and the lower gear plate, a pair of alignment pins, a spacer plate having a plurality of pin holes and shaft holes and a material flow hole and bolt holes there through and a plurality of temperature sensor recesses there into, a seal located between the lower gear plate and the spacer plate with an idler shaft passing through a shaft hole in the spacer plate and the shaft hole of the lower idler gear, an upper gear plate having a rectilinear configuration with an upper surface and a lower surface with a side edge having a thickness there between, the upper gear plate having a tri-lobed aperture located there through with each of the lobes having a third diameter, the upper gear plate having an outlet on the edge with an outlet stub coupled there to, the outlet communicating with the tri-lobed aperture, a pair of upper gears being a drive gear and an idler gear, each gear having a fourth diameter, the fourth diameter being slightly less than the third diameter, the gears each having an associated gear bearing and each being housed within the tri-lobed aperture of the upper gear plate, each of the gears having a shaft hole there through, a top plate having an upper surface and a lower surface with a side edge having a thickness there between, the lower surface of the top plate having a plurality of pin recesses and bearing recesses there in, the top plate also having a plurality of screw holes there through and a drive shaft hole there through, with a drive shaft having an associated seal retainer, the drive shaft sized to pass through the drive gears and plates and to be received by a bearing, a seal being positioned between the top plate and the upper gear plate, a plurality of heating plates being coupled to the sides of the assembled pump to provide heat to the pump and the material as it passes through the pump, a plurality of temperature sensors coupled to the temperature sensor recesses, the pump also having a plurality of bolts to couple the plates to each other, the pump coupled to the platen hole and being positioned to receive material from the container thereby outputting the material at a second pressure;

a pair of secondary feed hoses each having an inflow end and an outflow end with the inflow end of each hose being coupled with a clamp to the one of the outlets of the dual geared dual outlet material pump, each of the hoses having a central pathway there through to allow the passage of material through the hose, each of the hoses having an inner layer forming a smooth inner surface of the hose pathway and an armored crush-resistant outer layer and a heating layer disposed there between, the heating layer coupled to a power source by a wire, each of the hoses having a pair of hollow tubular fittings, with the fittings having a smooth inner surface having a radius beveled inlet to reduce the area of diminished flow within the hose and a stepped outer surface to provide a gripping surface thereto;

a pair of filters each having an inlet and an outlet with each filter having a plurality of filter elements associated there with, the inlet and outlet each having an associated cone shaped connector being coupled to the filter body, the filter body being centrally located and having associated O-rings, the inlet of each of the filters being coupled with a clamp to the outflow end of each of the secondary feed hoses;

a pair of injection valves with each valve having a material inflow end with a material inflow aperture being coupled to the outlet of a filter and the inflow end having an outflow aperture having a seventh diameter, each valve having a pressurized end with a pressure inflow aperture and a pressure cavity, the pressure cavity having a piston subassembly, the inflow end of the injection valve having a valve subassembly there within, the valve subassembly comprising a valve pin with a head having an eighth diameter with the eighth diameter being slightly smaller than the seventh diameter, the pin sized to block the outflow aperture, the valve pin having an associated spring and pin contact shaft, the inflow end of the injection valve being separated from the pressurized end of the injection valve by a diaphragm, the piston subassembly having a piston and an associated piston shaft and a plurality of associated O-rings, the piston shaft contacting the valve pin contact shaft and when a third pressure is introduced into the pressurized end the piston being moved toward the inflow end of the injection valve and the movement thereby effectuating the movement of the valve pin to an open position allowing material within the inflow end of the injection valve to move outward through the outflow aperture at a third pressure, when the pressure in the pressurized end of the injection valve drops the valve pin spring moves the valve pin to the closed position;

a third pressure source being coupled to the pressurized end of the injection valve;

a plurality of dies of similar configuration, each of the dies having a mounting plate and a distribution plate parallel with the mounting plate with the distribution plate having an upper edge with a material feed aperture for the receipt of liquid polymer, each die having a heater plate with an insulator dielectric plate between the heater and the mounting plate and a shim in an inverted U-shaped configuration adjacent to the distribution plate and an extrusion face between the shim and the heater, all die plates having a generally rectilinear configuration with an upper edge, a lower edge and side edges there between whereby polymer may be fed through the distribution plate there through the opening in the shim, each material feed aperture of each die being coupled to an outflow aperture of an injection valve;

a polymer dispensing assembly having a control box and a motor, the assembly having a plurality of dies coupled there to, a pair of roller-conveyors rotatable about parallel axes with exterior surfaces of each of the roller conveyers being positioned immediately beneath the shim of each of the dies, the dispensing assembly having a pair of rotary dies, the rotary dies having axes parallel with each other and the axes of the rotary dies being located between the roller-conveyors, the rotary dies being in closely spaced relationship with each other with circumferential pressure surfaces, the polymer dispensing assembly having a positive displacement pumping device providing dial-in incremental, thermal and precise dosage control located above the rotary dies for the periodic dispensing of particulate materials between packets formed with the solidification of the polymer moving between the rotary dies; and a master control panel coupling the output master supply assembly and dual gear, single outlet material pump and primary and secondary hoses and the intermediate output supply assembly and dual gear, dual outlet material pump and the polymer dispensing assembly for continuous and automatic control of the speed of the pump and the rate of rotation of the rollers and the heat of the tubes and the platen and the dies.

3. A polymer film casting and dispersion system comprising, in combination:

a first container of a polymer having a first volume;

an output master supply assembly having a control panel and a base and a plurality of vertical telescoping cylinders and a plurality of drive shafts and a pressure source, the assembly having a heated platen having a centrally located passageway there through with a motor moving the platen downward against the polymer in the container, the master supply assembly being coupled to the first container;

a pressure fed, heated, dual gear, single outlet material pump;

a heated primary feed hose having a radius beveled inlet;

a second container of a polymer having a second volume;

an intermediate output supply assembly having a control panel and a horizontal base and a plurality of vertical telescoping cylinders and a pressure source and at least one thrust shaft, the assembly also having a platen having a heating component, the platen having a centrally located hole there through, the intermediate output supply assembly being coupled to the second container of polymer;

a pressure fed, heated, dual gear, dual outlet material pump;

a pair of heated secondary hoses having a radius beveled inlet;

a pair of in-line filters;

a pair of injection valves each having an inflow end having a valve subassembly with a valve pin and an associated spring and a pressurized end having a piston subassembly, the inflow end being separated from the pressurized end by a diaphragm;

a pressure source being coupled to the pressurized end of the injection valve;

a plurality of dies each having a heater plate;

a polymer dispensing assembly having a control box and a motor and a plurality of dies and a pair of roller conveyors and a pair of rotary dies and a positive displacement pumping device; and a master control panel coupling each element to control the movement of material through the system.

4. A precision polymer film casting and injection system comprising, in combination:

a container of a polymer having a first volume;

an output master supply assembly having a control panel and a horizontal base and a plurality of vertical telescoping cylinders and a pair of cross members and an upper platform and a pressure source and a plurality of drive shafts and a platen, the platen being moveable in a upward and downward direction, the platen having a generally round disk shape having a heating component there within, the platen having a centrally located hole there through to form a passageway there through and producing a first pressure within the polymer;

a pressure fed, heated, dual gear, single outlet material pump comprising a rectilinear base plate and a lower gear plate and a pair of lower gears being a drive gear and an idler gear and a spacer plate and an upper gear plate and a pair of upper gears being a drive gear and an idler gear and a plurality of heating plates and a plurality of temperature sensors, the pump coupled to the platen and producing a second pressure;

a heated primary feed hose having an inflow end and an outflow end, the hose having an inner layer forming a smooth inner surface of the hose pathway and an armored crush-resistant outer layer and a heating layer disposed there between, the heating layer coupled to a heating source by a wire, the fittings having a smooth inner surface having a radius beveled inlet to reduce the area of diminished flow within the hose and a stepped outer surface to provide a gripping surface thereto;

a second container of a polymer having a second volume;

an intermediate output supply assembly having a control panel and a base and a plurality of vertical telescoping cylinders, and a motor providing a pressure force and a thrust shaft, the assembly having a platen, the platen being coupled to the thrust shaft, the platen having a heating component there within and producing a first pressure within the polymer;

a pressure fed, heated, dual gear, dual outlet material pump comprising a rectilinear base plate and a lower gear plate and a pair of lower gears being a drive gear and an idler gear and a spacer plate and an upper gear plate and a pair of upper gears being a drive gear and an idler gear and a plurality of heating plates and a plurality of temperature sensors, the pump producing a second pressure;

a pair of heated secondary feed hoses, each hose having an inflow end and an outflow end, each hose having an inner layer forming a smooth inner surface of the hose pathway and an armored crush-resistant outer layer and a heating layer disposed there between, the heating layer coupled to a heating source by a wire, the fittings having a smooth inner surface having a radius beveled inlet to reduce the area of diminished flow within the hose and a stepped outer surface to provide a gripping surface thereto;

a pair of injection valves with each valve having a material inflow end with a material inflow aperture and a pressurized end with a pressure inflow aperture and a pressure cavity, the pressure cavity having a piston subassembly, the inflow end of the injection valve having a valve subassembly there within, the valve subassembly comprising a valve pin with a head the pin having an associated spring and pin contact shaft, the inflow end of the injection valve being separated from the pressurized end of the injection valve by a diaphragm, the piston subassembly having a piston and an associated piston shaft contacting the valve pin contact shaft, the injection valve producing a third pressure;

a third pressure source being coupled to the pressurized end of the injection valve;

a plurality of dies of similar configuration, each of the dies having a mounting plate and a distribution plate, each die having a heater plate and a shim;

a polymer dispensing assembly having a control box and a motor, the assembly having a plurality of dies and a pair of roller-conveyors and a pair of rotary dies, the polymer dispensing assembly having a positive displacement pumping device; and a master control panel coupling the output master supply assembly and dual gear, single outlet material pump and primary and secondary hoses and the intermediate output supply assembly and dual gear, dual outlet material pump and the polymer dispensing assembly for continuous and automatic control of the speed of the pump and the rate of rotation of the rollers and the heat of the tubes and the platen and the dies.

5. A polymer film casting and dispersion system as described in claim 4 wherein the platen has a plurality of downwardly projecting fins.

* * * * *